United States Patent
Bridges et al.

(10) Patent No.: US 8,670,114 B2
(45) Date of Patent: Mar. 11, 2014

(54) DEVICE AND METHOD FOR MEASURING SIX DEGREES OF FREEDOM

(71) Applicant: FARO Technologies, Inc., Lake Mary, FL (US)

(72) Inventors: Robert E. Bridges, Kennett Square, PA (US); Lawrence B. Brown, Cochranville, PA (US); John M. Hoffer, Jr., Bel Air, MD (US)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/892,385

(22) Filed: May 13, 2013

(65) Prior Publication Data

US 2013/0250285 A1 Sep. 26, 2013

Related U.S. Application Data

(62) Division of application No. 12/620,070, filed on Nov. 17, 2009.

(60) Provisional application No. 61/115,136, filed on Nov. 17, 2008.

(51) Int. Cl.
*G01B 11/26* (2006.01)

(52) U.S. Cl.
USPC ........ 356/138; 356/139.03; 356/73; 356/612; 356/614

(58) Field of Classification Search
USPC .......................................... 356/138, 612, 614
See application file for complete search history.

(56) References Cited

U.S. PATENT DOCUMENTS

| | | | |
|---|---|---|---|
| 4,537,475 A | | 8/1985 | Summers et al. |
| 4,714,339 A | | 12/1987 | Lau et al. |
| 4,790,651 A | * | 12/1988 | Brown et al. ................ 356/4.09 |
| 5,267,014 A | * | 11/1993 | Prenninger .............. 356/139.03 |

(Continued)

FOREIGN PATENT DOCUMENTS

| | | |
|---|---|---|
| DE | 3530922 A1 | 8/1984 |
| WO | 03062744 A1 | 7/2003 |

(Continued)

OTHER PUBLICATIONS

Examination Report for GB Application No. GB1110252.2 dated May 24, 2013, 4 pgs.

(Continued)

*Primary Examiner* — Tarifur Chowdhury
*Assistant Examiner* — Isiaka Akanbi
(74) *Attorney, Agent, or Firm* — Cantor Colburn LLP

(57) ABSTRACT

A laser tracker system for measuring six degrees of freedom may include a main optics assembly structured to emit a first laser beam, a pattern projector assembly structured to emit a second laser beam shaped into a two-dimensional pattern, and a target. The target may include a retroreflector and a position sensor assembly. A center of symmetry of the retroreflector may be provided on a different plane than a plane of the position sensor assembly. A method of measuring orientation of a target may include illuminating the target with a laser beam comprising a two-dimensional pattern, recording a position of the two-dimensional pattern on a position sensor assembly to create a measured signature value of the two-dimensional pattern, and calculating an orientation of the target based on the measured signature value.

8 Claims, 17 Drawing Sheets

(56) References Cited

U.S. PATENT DOCUMENTS

| | | | |
|---|---|---|---|
| 5,973,788 | A | 10/1999 | Pettersen et al. |
| 6,166,809 | A | 12/2000 | Pettersen et al. |
| 6,193,371 | B1 | 2/2001 | Snook |
| 6,667,798 | B1 | 12/2003 | Markendorf et al. |
| 6,678,059 | B2 | 1/2004 | Cho et al. |
| 7,230,689 | B2 | 6/2007 | Lau |
| 7,312,862 | B2 | 12/2007 | Zumbrunn et al. |
| 7,800,758 | B1 | 9/2010 | Bridges et al. |
| 7,990,550 | B2 | 8/2011 | Aebischer et al. |
| 2012/0105821 | A1 | 5/2012 | Moser et al. |

FOREIGN PATENT DOCUMENTS

| | | |
|---|---|---|
| WO | 2006055770 A2 | 5/2006 |
| WO | 2007079601 A1 | 7/2007 |
| WO | 2007124010 A2 | 11/2007 |
| WO | 2010148526 A1 | 12/2010 |

OTHER PUBLICATIONS

Office Action for Chinese Patent Application No. 200980145893.6 issued Oct. 15, 2012, 7 pgs.
International Preliminary Report of Patentability for International Application No. PCT/US2009/064758 filed Nov. 17, 2009.
Examination Report for GB Application No. GB110252.2 dated Aug. 1, 2012, 5 pgs.
Examination Report for GB Application No. GB1110252.2 dated Jan. 9, 2013, 5 pgs.
International Search Report and Written Opinion for International Application No. PCT/US2009/064759, International Filing Date Nov. 17, 2009.
Office Action for Chinese Patent Application No. 200980145893.6 issued Aug. 8, 2013, 10 pgs.
English Abstract of CN1290850; Applicant: Univ Shanghai Communication; Published Date: Apr. 11, 2001; 1 pg.
English Abstract of CN1362692; Applicant: Univ Tianjin; Published Date: Aug. 7, 2002; 1 pg.
Examination Report for GB Application No. GB1110252.2 dated Jul. 23, 2013, 1 pg.
Examination Report for GB Application No. GB1110252.2 dated Jul. 8, 2013, 4 pg.
English Translation of Office Action for Japanese Patent Application No. 20111-536593 issued Aug. 3, 2013 8 pgs.
English Abstract of JP2005010585; Applicant: TDK Corp; Published Date: Jan. 13, 2005; 1 pg.
English Abstract of JPH06214186; Applicant: Eastman Kodak Co Ltd; Published Date: Aug. 5, 1994; 1 pg.
English Abstract of JPH09113223; Applicant: Fuji Xerox Co Ltd; Published Date: May 2, 1997; 1 pg.

* cited by examiner

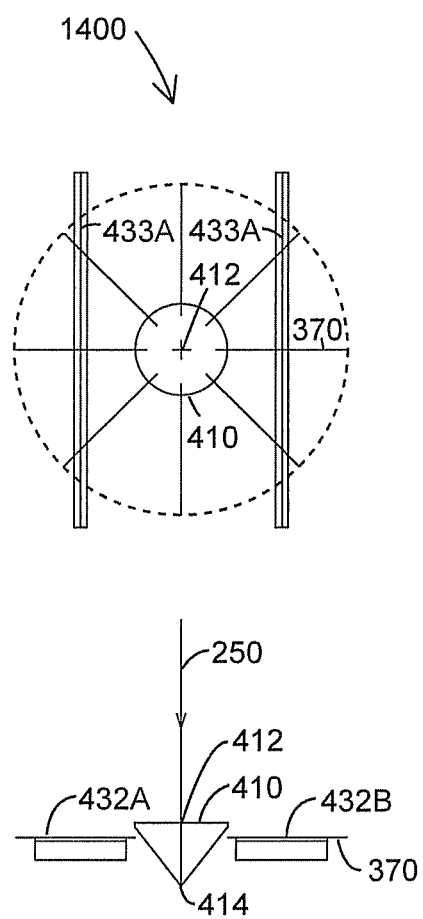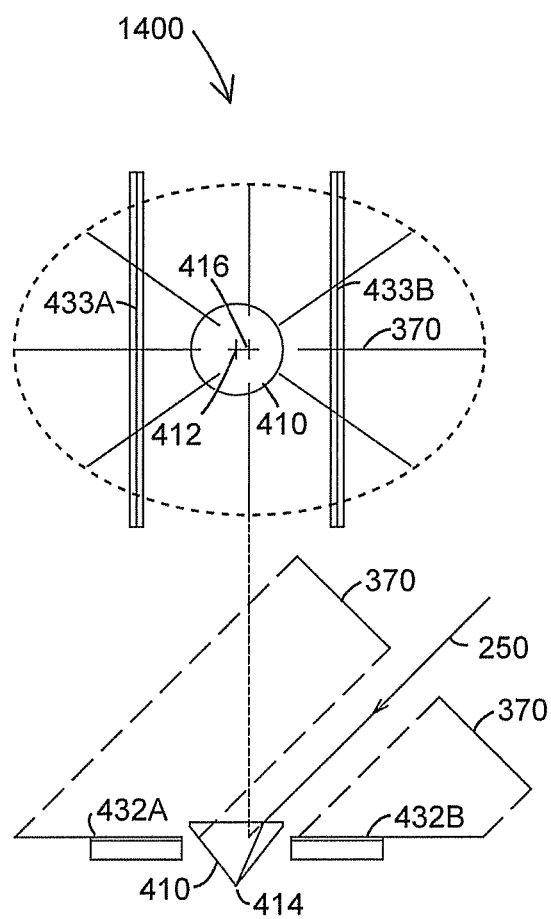
FIGURE 12A
FIGURE 12B

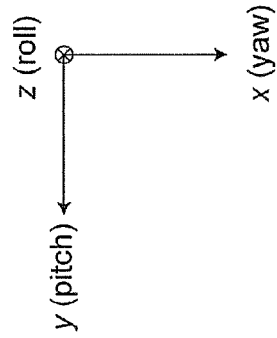
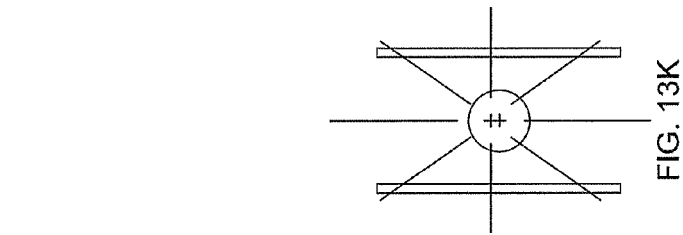
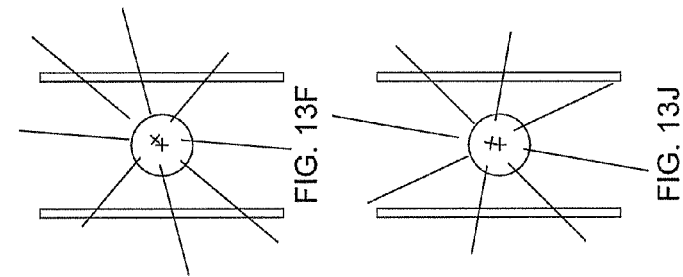
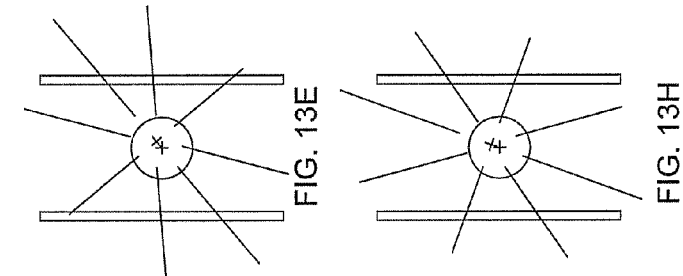
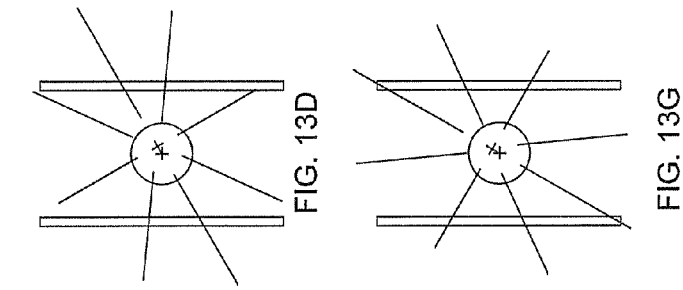

DEVICE AND METHOD FOR MEASURING SIX DEGREES OF FREEDOM

CROSS REFERENCE TO RELATED APPLICATIONS

This application is a divisional of U.S. patent application Ser. No. 12/620,070, filed Nov. 17, 2009, which claims priority to U.S. Provisional Application No. 61/115,136, filed Nov. 17, 2008 the entire contents of each of which are incorporated herein by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 to Lau et al.

The laser tracker is a particular type of coordinate-measuring device that tracks the retroreflector target with one or more laser beams it emits. A coordinate-measuring device that is closely related to the laser tracker is the laser scanner. The laser scanner steps one or more laser beams to points on a diffuse surface.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Yet there are measurements in which six, rather than just three, degrees of freedom are needed. Here are examples of four such measurements: (1) a six degree-of-freedom (6 DOF) tracker measures the location of a probe tip that is blocked from the view of the tracker by an intermediate object; (2) a 6 DOF tracker follows the motion of a scanning device that measures 3D coordinates using a pattern of light; (3) a 6 DOF tracker finds the orientation, as well as position, of a robot end effector or similar rigid body; and (4) a 6 DOF tracker measures fine object features using a fine probe tip rather than the large spherical surface of an SMR.

Several systems based on laser trackers are available or have been proposed for measuring six degrees of freedom. In one system, a camera and laser tracker are used with a target containing a retroreflector and multiple points of light. Exemplary systems are described by U.S. Pat. No. 5,973,788 to Pettersen et al. and U.S. Pat. No. 6,166,809 to Pettersen et al.

In a second system, the target is kept nearly perpendicular to the tracker laser beam by means of motorized or hand adjustment. A beam splitter in the target sends some of the incoming laser light to a position detector, which determines pitch and yaw angles of the target. The rest of the light goes to a retroreflector. Of the reflected light, some passes to a polarizing beam splitter, detectors, and electronics, which determine the target roll angle. The remaining light returns to the tracker. An exemplary system is described by U.S. Pat. No. 7,230,689 to Lau.

A third system is the same as the second system except that the roll sensor is replaced by level sensor that measures the tilt of the target relative to gravity. An exemplary system is described in U.S. Pat. No. 7,230,689 to Lau.

In a fourth system, the tracking device measures the position of a cube-corner retroreflector while also splitting off some of the returning light and sending it to a photosensitive array for analysis. The photosensitive array reads marks intentionally placed on the retroreflector. These marks may, for example, be the intersection lines of the three cube-corner reflection planes. The pitch, yaw, and roll angles of the retroreflector are found by analyzing the pattern displayed on the array. An exemplary system is described in U.S. Pat. No. 5,267,014 to Prenninger.

In a fifth system, an aperture is cut into the vertex of the cube-corner retroreflector. Light passing through the aperture strikes a position detector, thereby providing pitch and yaw angles of the target. The roll is found by one of three means. In the first means, a camera mounted on the tracker measures illuminated points of light in the vicinity of the retroreflector. In the second means, a light source mounted on the tracker emits light over a relatively wide angle, which is picked up by position detector. In the third means, a light source mounted on the tracker projects a laser stripe onto the target. The stripe is picked up by one or more linear arrays. An exemplary embodiment is described in U.S. Pat. No. 7,312,862 to Zumbrunn et al.

Each of these systems of obtaining 6 degrees of freedom (DOF) with a laser tracker has shortcomings. The first system uses a camera to view multiple LEDs in the vicinity of a retroreflector target. A commercial system of this type available today has a camera mounted on top of a tracker. A motorized zenith axis tilts the camera and motorized zoom lens focuses the spots of light. These motorized features are complicated and expensive.

In some implementations of the second system, a two-axis mechanical servo mechanism keeps the target pointing back at the tracker. In other implementations, the user manually points the target toward the tracker. In the first instance, the implementation is complicated and expensive and, in the second instance, the implementation is inconvenient for the user. In addition, the second system uses a polarizing beam splitter, which must be perpendicular to the laser beam for high polarization contrast. For this reason, performance tends to degrade in a handheld system.

In the third system, level sensors respond to tilt (a gravity effect) and acceleration in the same way. Consequently, when a tilt sensor is placed in a hand-held probe, the resulting accelerations caused by hand movement can be mis-interpreted as sensor tilt. To get around this problem, the manufacturers of level sensors sometimes add damping mechanisms (such as damping fluid) to slow the response. Such a damped tilt sensor responds sluggishly to changes in roll angle, which is undesirable.

The fourth system, which reflects light directly from a beam splitter to a photosensitive array to view lines on a cube corner, is limited in its depth of field before the line images on the array become blurry and distorted.

The fifth system requires that an aperture be cut into the retroreflector, thereby degrading retroreflector performance somewhat. It places a position detector, which may be a photosensitive array or a position sensitive detector (PSD), behind the aperture. This aperture is only moderately accurate in the case of the PSD and relatively slow in the case of the photosensitive array. In addition, the system mounts one of three additional means on the tracker. All three means, as described above, are complicated and expensive.

In view of these limitations, there is a need today for a laser-tracker based 6 DOF measuring system that is simple, inexpensive, and accurate.

SUMMARY OF THE INVENTION

At least an embodiment of a laser tracker system for measuring six degrees of freedom, the system may include a tracking unit comprising and a target. The tracking target may include a payload assembly rotatable around at least one axis. The payload assembly may include a main optics assembly structured to emit a first laser beam and a pattern projector assembly structured to emit a second laser beam shaped into a two-dimensional pattern. The target may include a retroreflector and a position sensor assembly provided proximate to the retroreflector. A center of symmetry of the retroreflector is provided on a different plane than a plane of the position sensor assembly.

At least an embodiment of a pattern projector assembly for use in a laser tracker system for measuring six degrees of freedom may include a laser structured to emit a laser beam, a beam expander structured to expand the second laser beam, and a shaping element structured to shape the expanded second laser beam into a two-dimensional pattern.

At least an embodiment of a target for use with a laser tracker system for measuring six degrees of freedom may include a retroreflector and a position sensor assembly provided proximate to the retroreflector. A center of symmetry of the retroreflector is provided on a different plane than a plane of the position sensor assembly.

At least an embodiment of a method of measuring orientation of a target may include providing the target having a retroreflector and a position sensor assembly provided proximate to the retroreflector, wherein a center of symmetry of the retroreflector is provided on a different plane than a plane of the position sensor assembly; illuminating the target with a laser beam shaped a two-dimensional pattern; recording a position of the two-dimensional pattern on the position sensor assembly to create a measured signature value of the pattern orientation; iteratively comparing the measured signature value with a theoretical signature value; and calculating an orientation of the target from the measured signature value when a difference between the measured signature value and the theoretical signature value satisfies a convergence criteria.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 12A and 12B are top and side schematic views of components of an exemplary target for angles of incidence of 0 and 45 degrees, respectively; and FIGS. 13A-13K are top schematic views of components of an exemplary target for angles of incidence of 45 degrees with tilt directions varying in 10 degree increments from entirely yaw angle to entirely pitch angle.

DETAILED DESCRIPTION OF THE PREFERRED EMBODIMENTS

Figure 1:
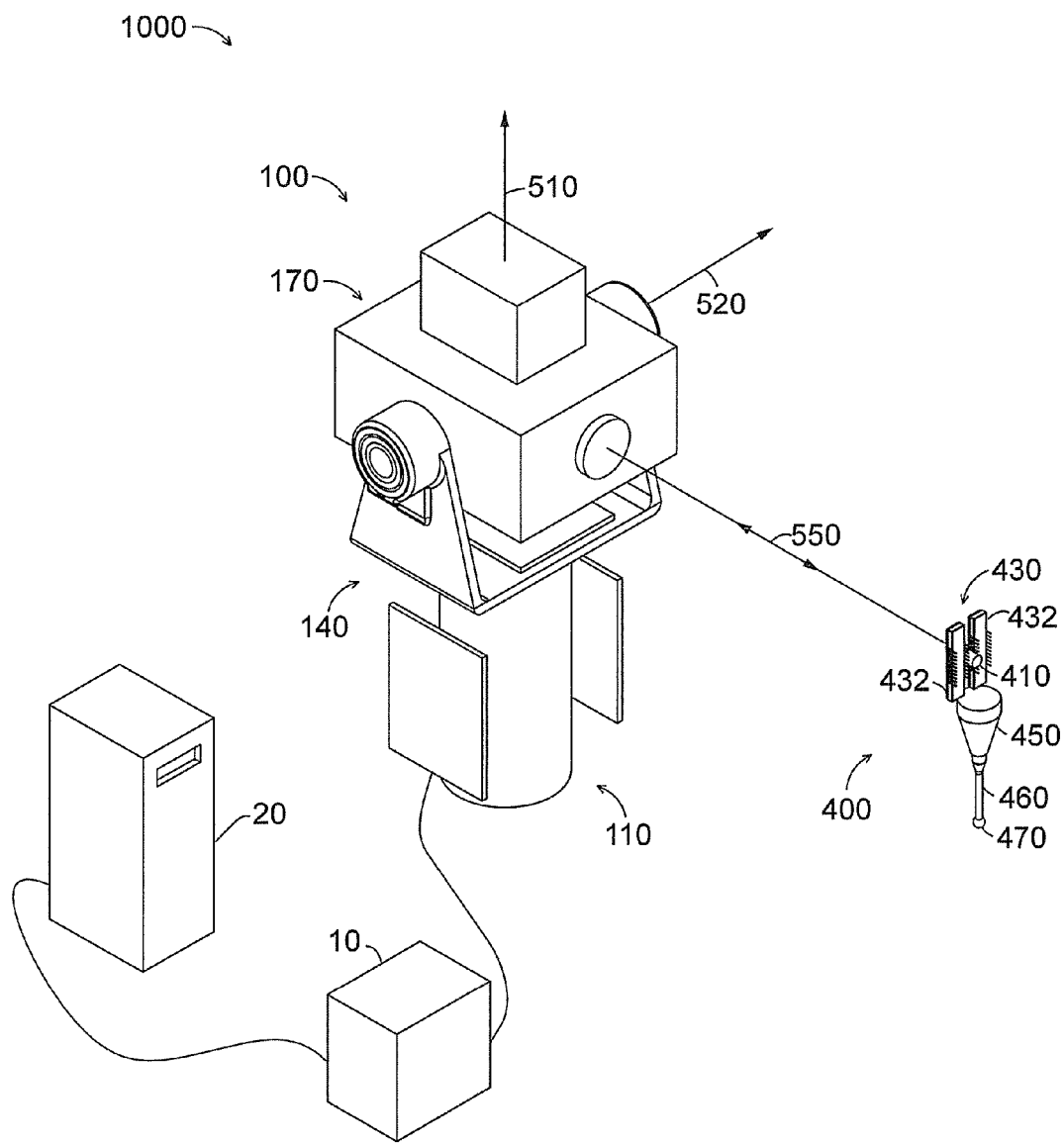
FIG. 1 is a perspective view of an exemplary six degree of freedom tracking system.

As shown in FIG. 1, an exemplary six degree of freedom (6 DOF) tracking system 1000 may comprise tracking unit 100, target 400, power supply/control unit 10, and computer 20. Six degrees of freedom may be the x, y, z coordinates, and the pitch, roll, and yaw angles of target 400 for example.

Tracking unit 100 may comprise azimuth assembly 110, zenith assembly 140, and payload assembly 170. Azimuth assembly 110 is stationary with respect to the stand to which it is mounted. Zenith assembly 140 rotates about azimuth axis 510, and payload assembly 170 rotates about zenith axis 520. In addition, because payload assembly 170 is mounted to zenith assembly 140, it rotates about azimuth axis 510 as well as zenith axis 520.

Power supply/control unit 10 provides power to tracking unit 100 and may also provide control and computing functions. Computer 20 may use a variety of software packages to analyze and display data.

Figure 5:
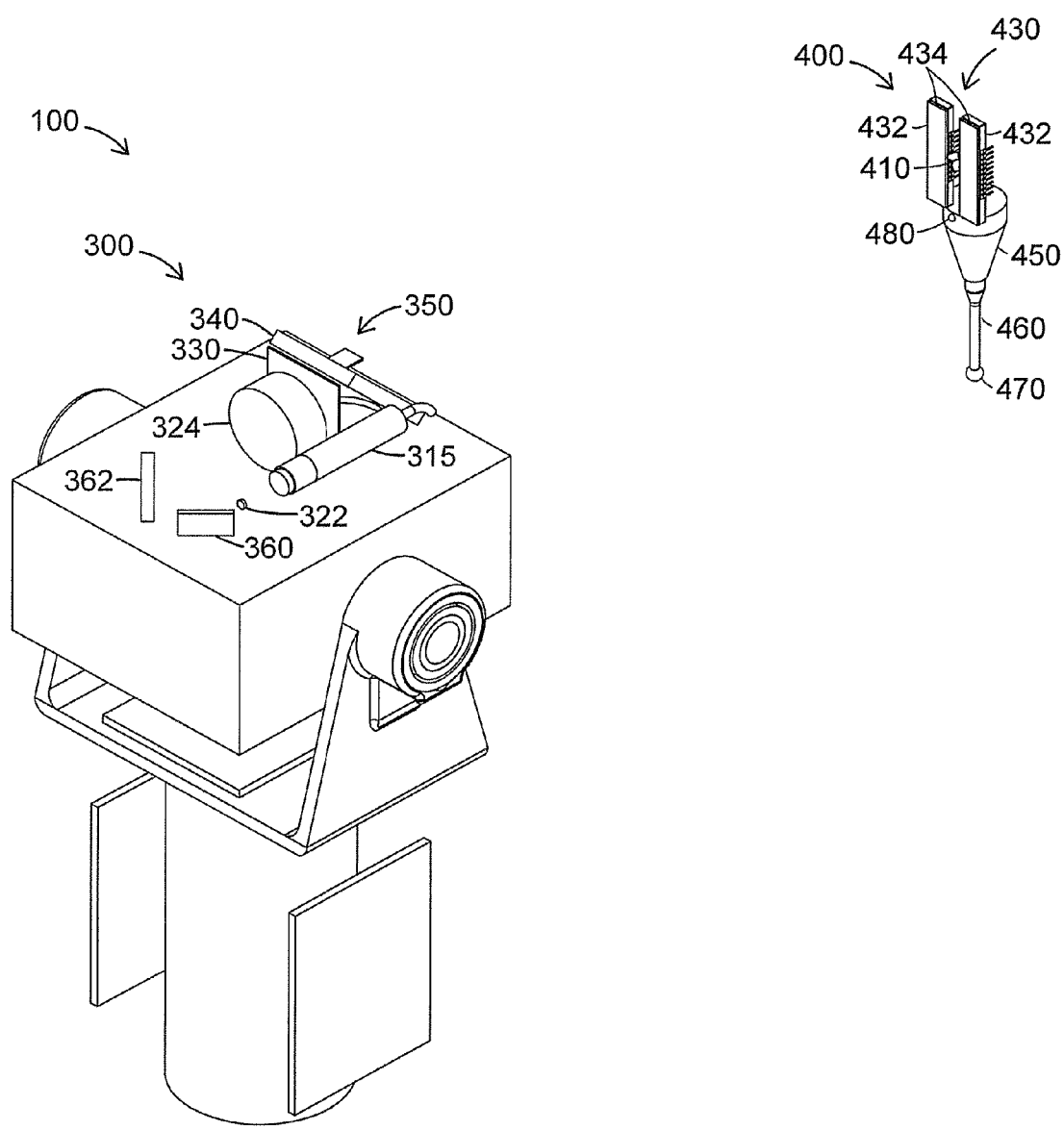
FIG. 5 is a perspective view of an exemplary payload assembly and exemplary target.
Figure 6:
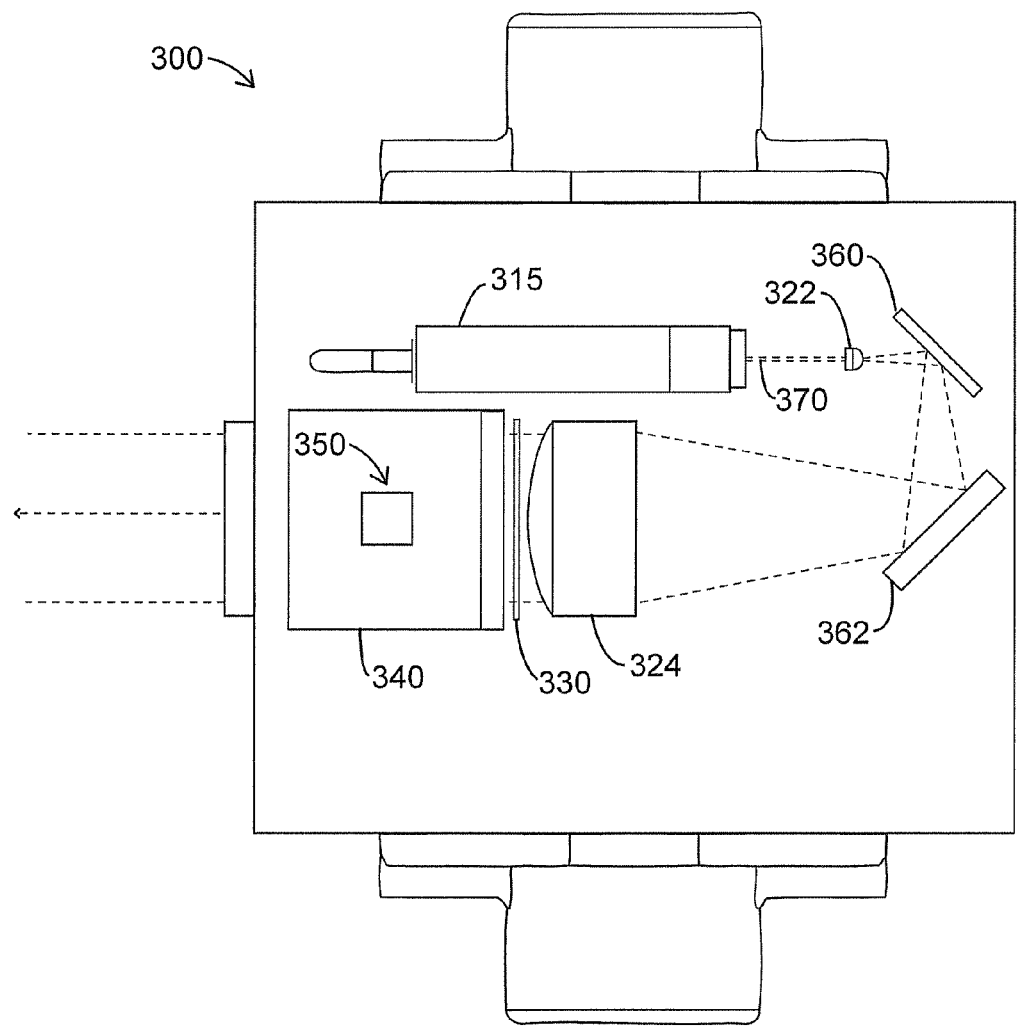
FIG. 6 is a top view of an exemplary pattern projector.
Figure 7:
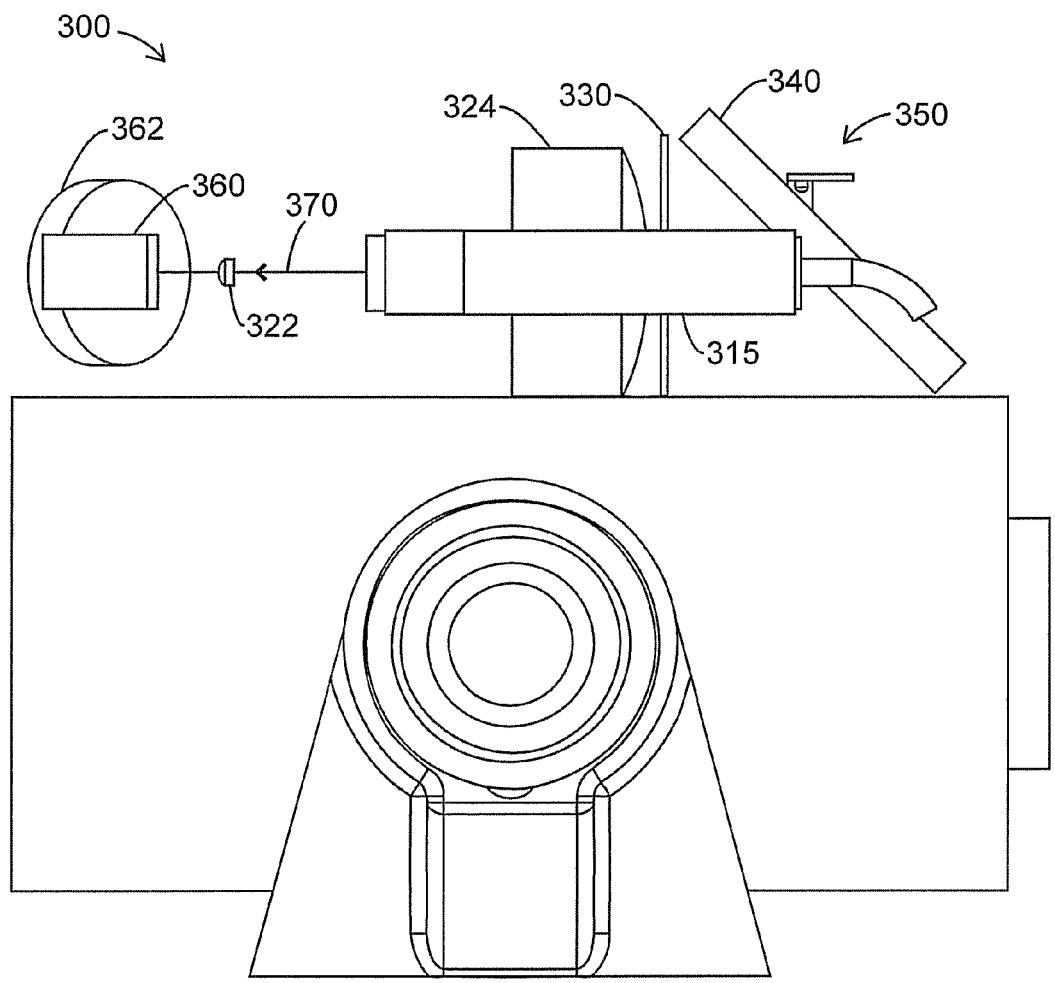
FIG. 7 is a side view of an exemplary pattern projector.

Target 400 comprises retroreflector 410, position sensor assembly 430, probe body 450, probe stylus 460, probe tip 470, locator spot 480, electronics (not shown), and battery (not shown). Locator spot 480 is shown in FIG. 5. Position sensor assembly 430 comprises position detectors 432 and optical filters 434. Elements of target 400 are rigidly attached to one another. Laser beam 550 emitted by tracking unit 100 intersects retroreflector 410 and position detectors 432.

Azimuth and Zenith Assemblies

Figure 2:
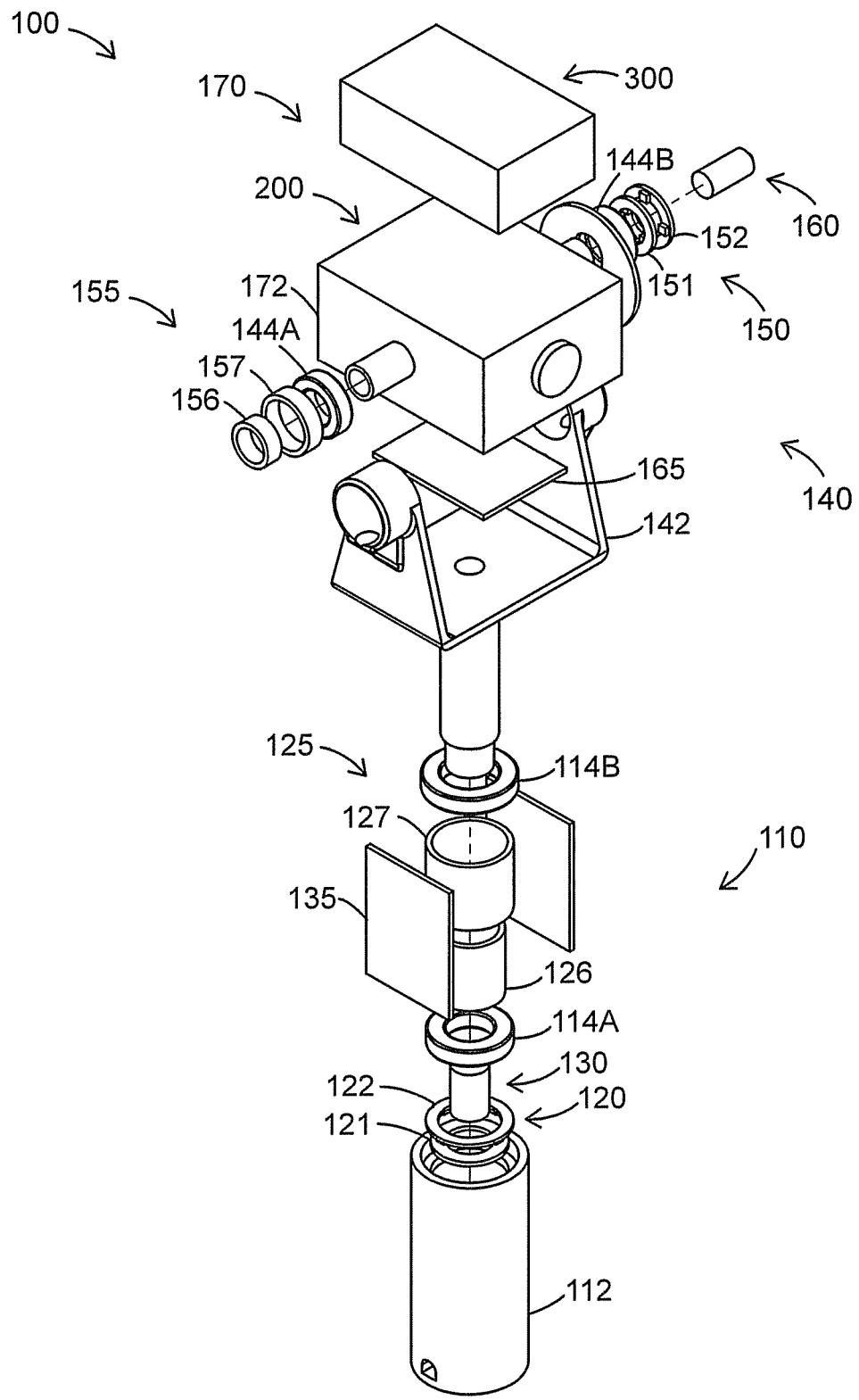
FIG. 2 is an exploded view of an exemplary tracking unit.
Figure 3:
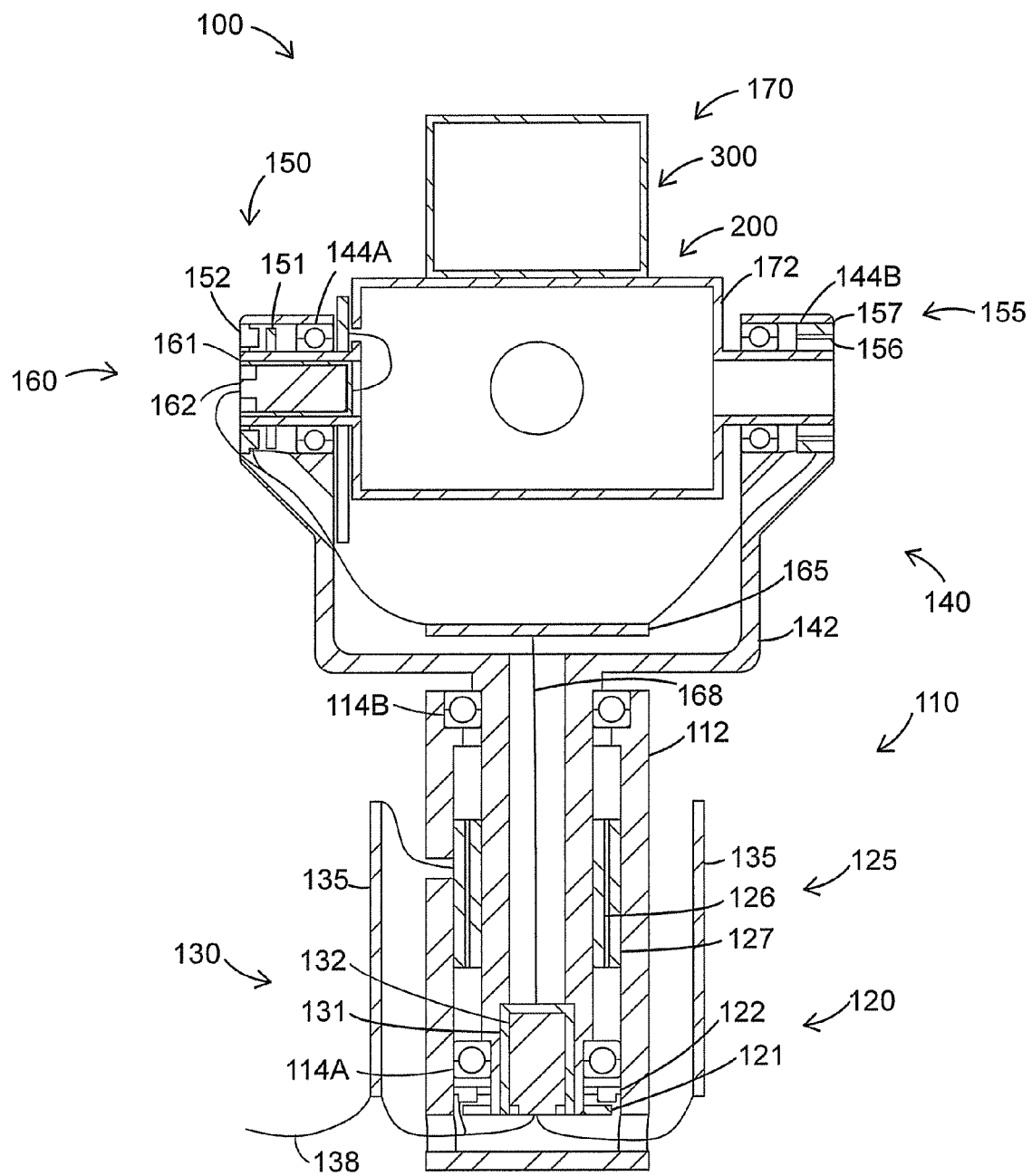
FIG. 3 is a cross-section view of an exemplary tracking unit.

Details of tracking unit 100 are shown in exploded view in FIG. 2 and in cross section in FIG. 3. Azimuth assembly 110 comprises post housing 112, azimuth encoder assembly 120, lower and upper azimuth bearings 114A, 114B, azimuth motor assembly 125, azimuth slip ring assembly 130, and azimuth circuit boards 135.

The purpose of azimuth encoder assembly 120 is to accurately measure the angle of rotation of yoke housing 142 with respect to the post housing 112. Azimuth encoder assembly 120 comprises encoder disk 121 and read-head assembly 122. Encoder disk 121 is attached to the shaft of yoke housing 142, and read head assembly 122 is attached to stationary post assembly 110. Read head assembly 122 comprises a circuit board onto which one or more read heads are fastened. Laser light sent from read heads reflect off fine grating lines on encoder disk 121. Reflected light picked up by detectors on encoder read head(s) is processed to find the angle of the rotating encoder disk in relation to the fixed read heads.

Azimuth motor assembly 125 comprises azimuth motor rotor 126 and azimuth motor stator 127. Azimuth motor rotor comprises permanent magnets attached directly to the shaft of yoke housing 142. Azimuth motor stator 127 comprises field windings that generate a prescribed magnetic field. This magnetic field interacts with the magnets of azimuth motor rotor 126 to produce the desired rotary motion. Azimuth motor stator 127 is attached to post frame 112.

Azimuth circuit boards 135 represent one or more circuit boards that provide electrical functions required by azimuth components such as the encoder and motor. Azimuth slip ring assembly 130 comprises outer part 131 and inner part 132. Wire bundle 138 emerges from power supply/control unit 10 and may carry power to the tracker or signals to and from the tracker. Some of the wires of wire bundle 138 may be directed to connectors on circuit boards. In the example shown in FIG. 3, wires are routed to azimuth circuit boards 135, encoder read head assembly 122, and azimuth motor assembly 125. Other wires are routed to inner part 132 of slip ring assembly 130. Inner part 132 is attached to post assembly 110 and consequently remains stationary. Outer part 131 is attached to yoke assembly 140 and consequently rotates with respect to inner part 132. Slip ring assembly 130 is designed to permit low impedance electrical contact as outer part 131 rotates with respect to the inner part 132.

Zenith assembly 140 comprises yoke housing 142, zenith encoder assembly 150, left and right zenith bearings 144A, 144B, zenith motor assembly 155, zenith slip ring assembly 160, and zenith circuit board 165.

The purpose of zenith encoder assembly 150 is to accurately measure the angle of rotation of payload frame 172 with respect to yoke housing 142. Zenith encoder assembly 150 comprises zenith encoder disk 151 and zenith read-head assembly 152. Encoder disk 151 is attached to payload housing 142, and read head assembly 152 is attached to yoke housing 142. Zenith read head assembly 152 comprises a circuit board onto which one or more read heads are fastened. Laser light sent from read heads reflect off fine grating lines on encoder disk 151. Reflected light picked up by detectors on encoder read head(s) is processed to find the angle of the rotating encoder disk in relation to the fixed read heads.

Zenith motor assembly 155 comprises zenith motor rotor 156 and zenith motor stator 157. Zenith motor rotor 156 comprises permanent magnets attached directly to the shaft of payload frame 172. Zenith motor stator 157 comprises field windings that generate a prescribed magnetic field. This magnetic field interacts with the rotor magnets to produce the desired rotary motion. Zenith motor stator 157 is attached to yoke frame 142.

Zenith circuit board 165 represents one or more circuit boards that provide electrical functions required by zenith components such as the encoder and motor. Zenith slip ring assembly 160 comprises outer part 161 and inner part 162. Wire bundle 168 emerges from azimuth outer slip ring 131 and may carry power or signals. Some of the wires of wire bundle 168 may be directed to connectors on circuit board. In the example shown in FIG. 3, wires are routed to zenith circuit board 165, zenith motor assembly 150, and encoder read head assembly 152. Other wires are routed to inner part 162 of slip ring assembly 160. Inner part 162 is attached to yoke frame 142 and consequently rotates in azimuth angle only, but not in zenith angle. Outer part 161 is attached to payload frame 172 and consequently rotates in both zenith and azimuth angles. Slip ring assembly 160 is designed to permit low impedance electrical contact as outer part 161 rotates with respect to the inner part 162.

Main Optics Assembly

Figure 4:
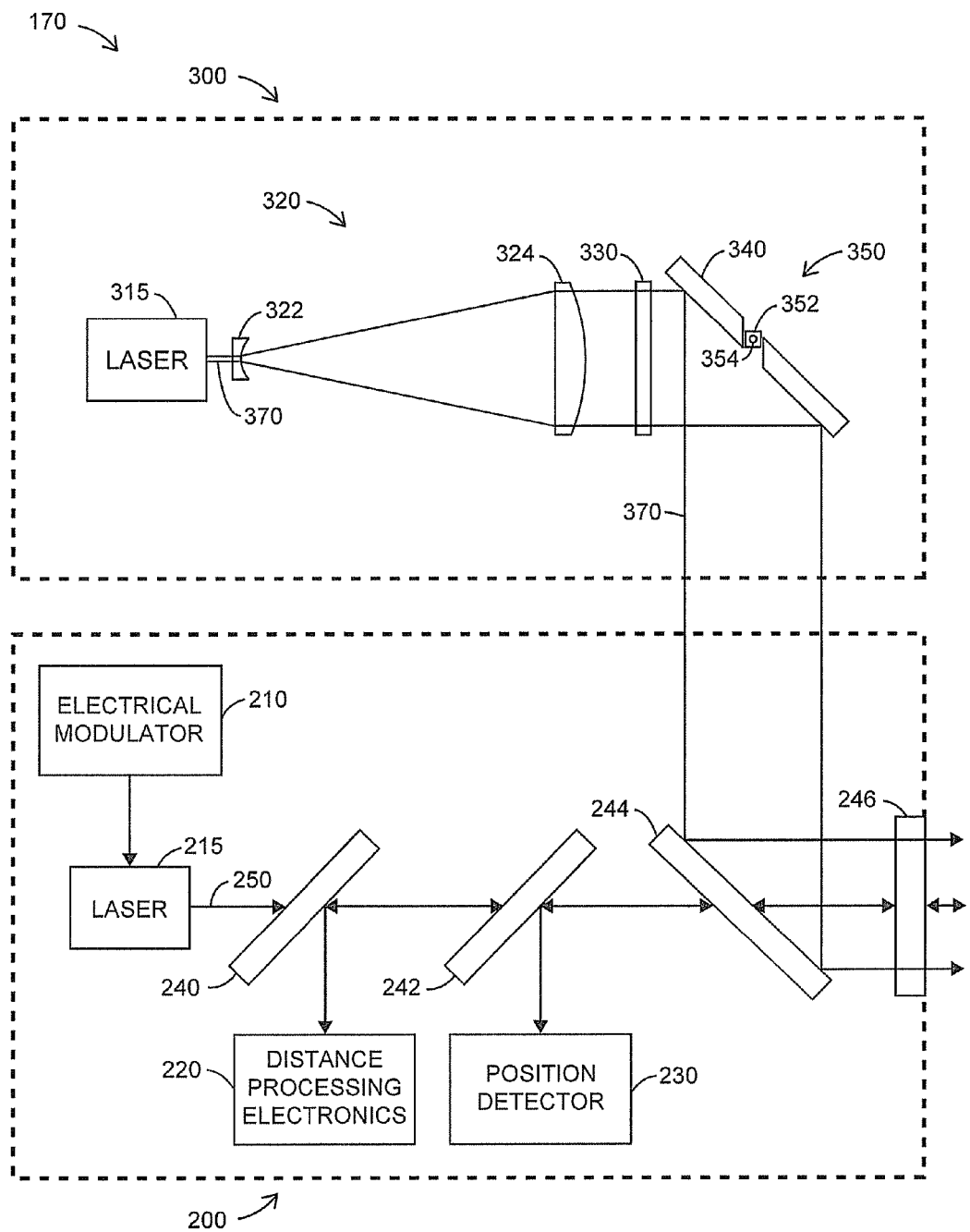
FIG. 4 is a block diagram of an exemplary payload assembly.

Payload assembly 170 comprises main optics assembly 200 and pattern projector assembly 300, as shown in FIG. 4. Main optics assembly 200 comprises electrical modulator 210, laser 215, distance processing electronics 220, position detector 230, beam splitters 240, 242, dichroic beam splitter 244, and output window 246. Laser light emitted by laser 215 passes through beam splitter 240. This beam splitter may be made of glass, as shown in FIG. 4, or it may be a fiber-optic beam splitter. Beam splitter 240 transmits part of the laser light 250 and reflects the remainder. Beam splitter 240 is needed is to pass part of the returning (retroreflected) laser light to distance processing electronics 220. The type of distance-measuring system shown in FIG. 4 is an absolute distance meter (ADM) based on intensity modulation and phase-measuring methods. An exemplary ADM of this type is described in U.S. Pat. No. 7,352,446 to Bridges and Hoffer. Alternatively, a different type of ADM could be used or the distance meter in main optics assembly 200 could be an interferometer (IFM) rather than an ADM. In the latter case, electrical modulator 210 would not be needed and the processing electronics would be of a different type. Also, the lasers would be different. For an IFM, the laser would need to be frequency stabilized at a known wavelength and have a long coherence length. For an ADM, the laser would preferably be capable of modulation at frequencies of at least a few GHz. It is also possible to combine IFM and ADM in main optics assembly 200. In this case, a suitable beam splitter would be used to combine the IFM and ADM laser beams on the way out and separate the laser beams on the way back in.

After passing through beam splitter 240, laser beam 250 travels to beam splitter 242. This beam splitter transmits most of the laser light (say, 85%) and reflects the remainder (say, 15%). The purpose of beam splitter 242 is to send part of the returning (retroreflected) laser light to position detector 230 for reasons explained below. Laser beam 250 travels to dichroic beam splitter 244 and passes through to output window 246 by which it exits tracking unit 100. The purpose of dichroic beam splitter 244 is to permit laser beam 250 to be combined with laser beam 370 generated in stripe projection assembly 300 on the way out of tracking unit 100. Dichroic beam splitter 244 is made of glass and is coated, preferably with multiple layers of thin film dielectric material, to enable transmission of some wavelengths and reflection of other wavelengths. For example, if laser 215 is a distributed feedback (DFB) laser of wavelength 1550 nm and laser 315 is a diode laser of wavelength 635 nm, then dichroic beam splitter 244 would be coated to transmit 1550 nm laser light and reflect 635 nm laser light.

Laser beam 550 that passes out of tracking unit 100 is a combination of laser beams 250 and 370. Laser beam 250 strikes retroreflector 410. It is desirable to minimize the size of laser beam 250 over the measurement range of the tracker in order to reduce clipping of laser beam 250 by retroreflector 410, which may be a cube-corner retroreflector. To minimize the size of laser beam 250 over the measurement range, the profile of the laser beam is shaped as nearly as possible to a Gaussian function. This results in the smallest possible divergence angle for the propagating laser beam.

If laser beam 250 strikes the center of retroreflector 410, the laser beam retraces its original path to tracking unit 100. If laser beam 250 strikes off the center of retroreflector 410, the laser beam reflects to the other side of retroreflector 410 and returns parallel to, but not coincident with, outgoing laser beam 250.

When laser light 250 re-enters tracking unit 100 through output window 246, it passes through dichroic beam splitter 244 and travels to beam splitter 242, which reflects some of the return light to position detector 230. If laser beam 250 strikes the center of retroreflector 410, the returning laser beam strikes the center of position detector 230. If returning laser beam strikes off the center of position detector 230, the returning laser beam strikes off the center of position detector 230 and an error signal is generated. This error signal activates azimuth motor assembly 125 and zenith motor assembly 155 to steer laser beam 250 to the center of retroreflector 410. By this means, laser beam 550 from tracking unit 100 is able to follow movements of retroreflector 410. In other words, laser beam 550 tracks retroreflector 410.

Position detector 230 may be a position sensitive detector (PSD). Position sensitive detectors may be of the lateral effect type or the quadrant type. Either may be used, but the lateral effect type produces a voltage output that is more linear with respect to the position of the laser beam that strikes it. For this reason, the lateral effect type of PSD is preferred. Alternatively, a photosensitive array, rather than a PSD, may be used. The photosensitive array may be a CCD or CMOS array, for example. These arrays are highly linear and provide very accurate indication of return beam position.

Stripe Generator Assembly

Tracking unit 100 and power supply/control unit 10 are able to measure three degrees of freedom (DOF) of retroreflector 410 without stripe projection assembly 300. The three degrees of freedom are distance, azimuth angle, and zenith angle to the target, which can be converted to other coordinates such as x, y, and z. Three degrees of freedom are enough to allow measurement of an object with a symmetrical tracker target such as an SMR, but they are not enough to find the coordinates of probe tip 470. To do this, the system needs to measure 6 DOF.

The measurement of 6 DOF is made possible through the combined action of stripe generator assembly 300, main optics assembly 200, and target 400. As shown in FIGS. 4-7, one possible embodiment of stripe generator assembly 300 comprises laser 315, beam expander assembly 320, apodizer 330, special mirror 340, and camera assembly 350. Beam expander assembly 320 comprises negative lens 322 and positive lens 324. Camera assembly 350 comprises camera 352 and at least one light emitting diode (LED) 354. A hole is cut into special mirror 340 to permit visibility of target 400 to camera 352 and at least one LED 354. Laser 315 may be preferably a visible laser having a power that is in the eye safe range but that can be seen when shined against an object. For example, in one embodiment, this laser is a red diode laser having an output power of 39 mW. The laser is selected to have a single-mode transverse mode output with a Gaussian profile and good beam quality factor (say, $M^2 < 1.1$). Laser beam 370 is sent through negative lens 322 and positive lens 324 of beam expander 320. The distance between negative lens 322 and positive lens 324 is adjusted to collimate laser light 370 that emerges from positive lens 324. The laser beam may optionally be bent by fold mirrors 360, 362 to make laser pattern projector 300 more compact.

Figure 17:
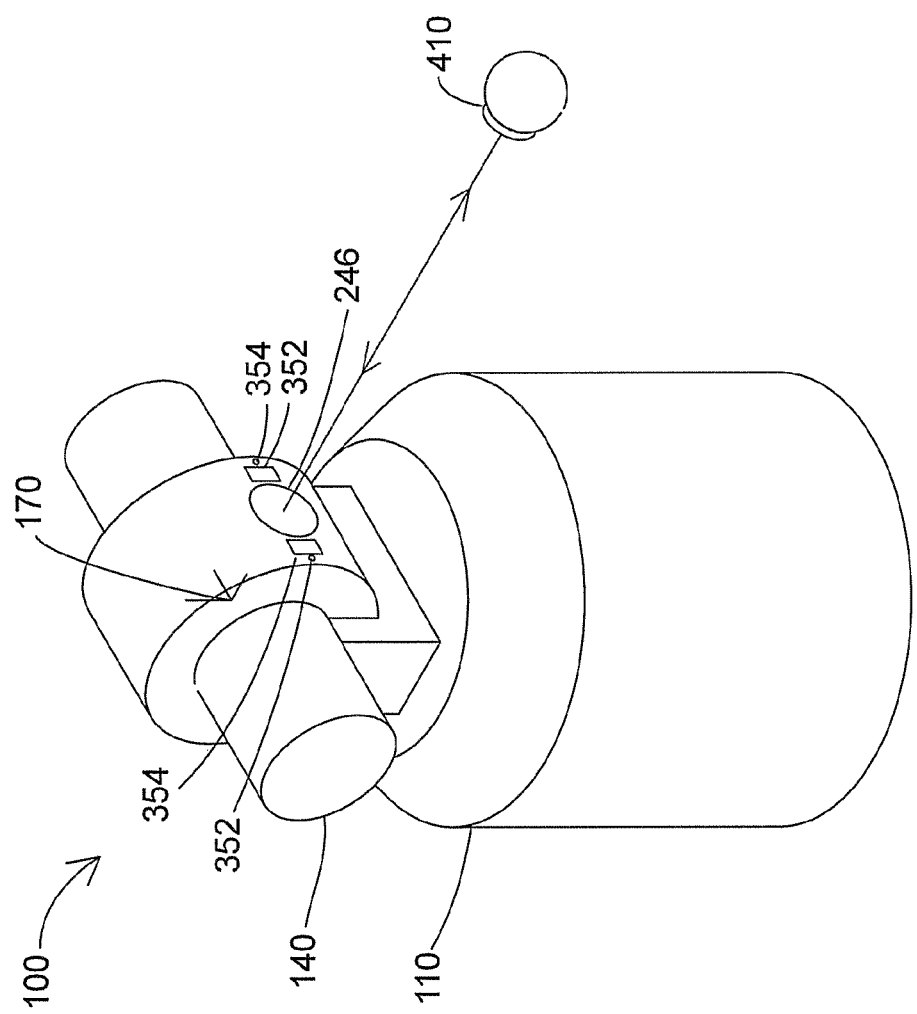
FIG. 17 shows a perspective view of a laser tracker system having at least two camera assemblies.

Alternatively, it is possible to use one or more cameras in a different arrangement than shown in FIG. 4. For example, as shown in FIG. 17, two small assemblies 352 could be placed symmetrically or asymmetrically about or proximate to the output window 246 on the front of payload assembly 170, each with at least one LED. Such an arrangement would provide stereoscopic viewing to provide an estimate of distance and angles to target 400. In an alternative embodiment, the cameras can be mounted on yoke housing 142.

Figure 8:
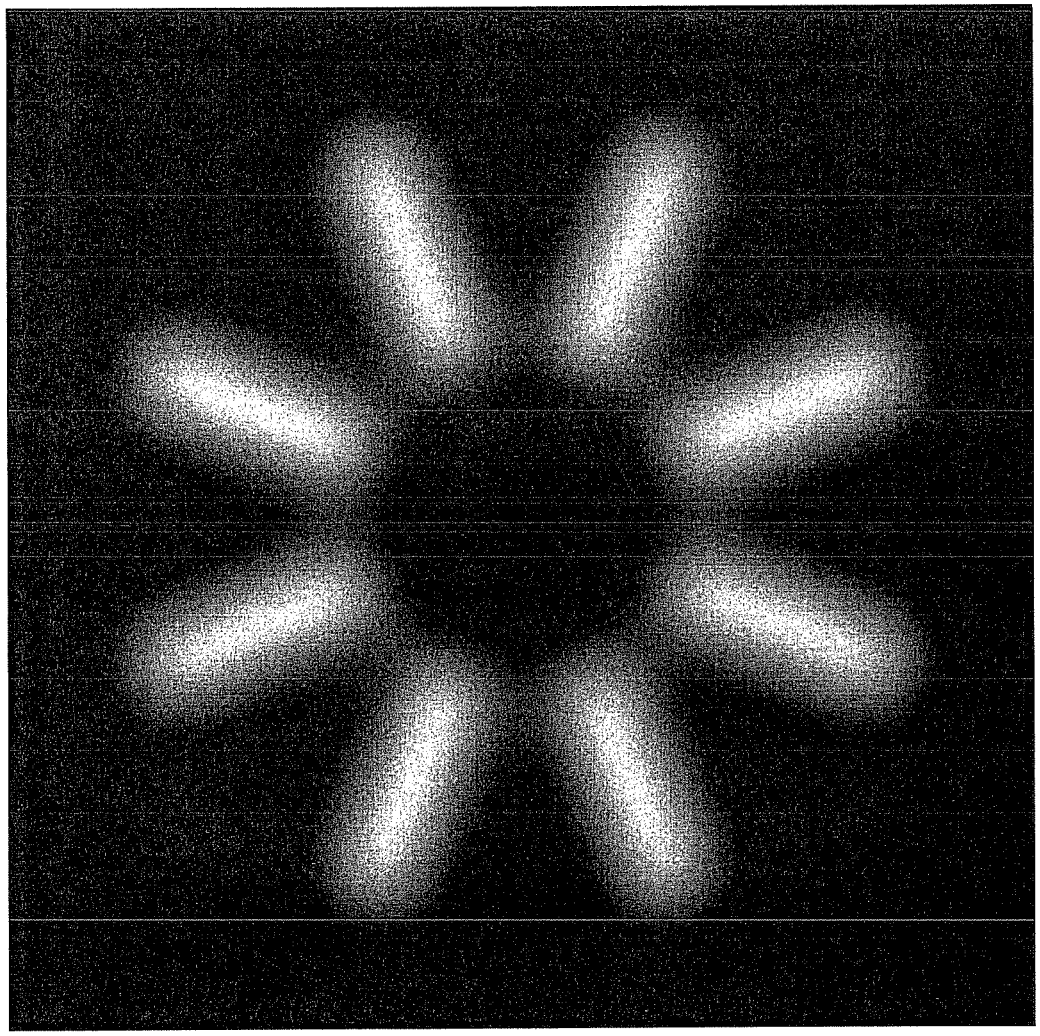
FIG. 8 is an exemplary transmittance pattern of an exemplary apodizer.

Collimated laser light 370 passes through apodizer 330 or other suitable shaping element, which shapes the light into a two-dimensional pattern. For example, in at least one embodiment, the two-dimensional pattern may be pattern of stripes or other suitable pattern. The apodizer may be a continuous tone film transparency attached with optical cement between two glass plates. The laser light reaching apodizer 330 has a Gaussian shape, which in one embodiment has a diameter of 44 mm. The transmittance characteristics of the apodizer are selected to produce an optical irradiance (optical power per unit area) at the output of the apodizer having particular characteristics that will now be described for one embodiment. The output transmittance of one embodiment of the apodizer is shown in FIG. 8. In the embodiment shown in FIG. 8, apodizer is 38 mm on a side and there are 8 stripes, each of length 15 mm. At the center of the apodizer there is a dark area of diameter 8 mm. The shape of each of the 8 stripes on the apodizer is more or less that of a two-dimensional Gaussian pattern with the width of the stripe larger in one dimension than the other. The shape is not exactly Gaussian along the long dimension of the stripe as a smoothing filter has been applied to maintain a smooth transition to nearly zero at the edges without decreasing the width of the Gaussian shape too much. It is also possible to use other apodizer patterns and get good results.

Figure 9:
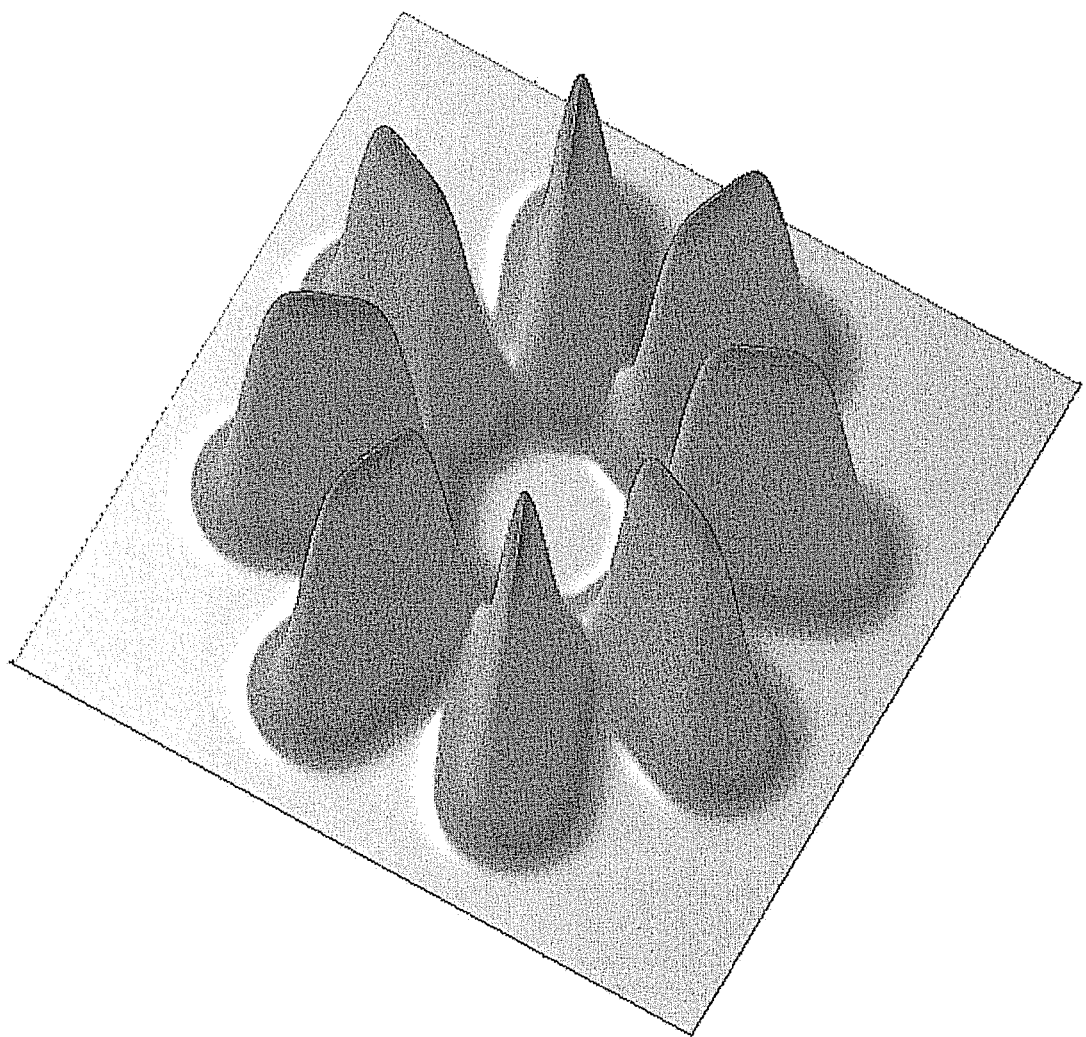
FIG. 9 is a three-dimensional plot showing exemplary irradiance pattern of a propagating laser beam following an apodizer.
Figure 10:
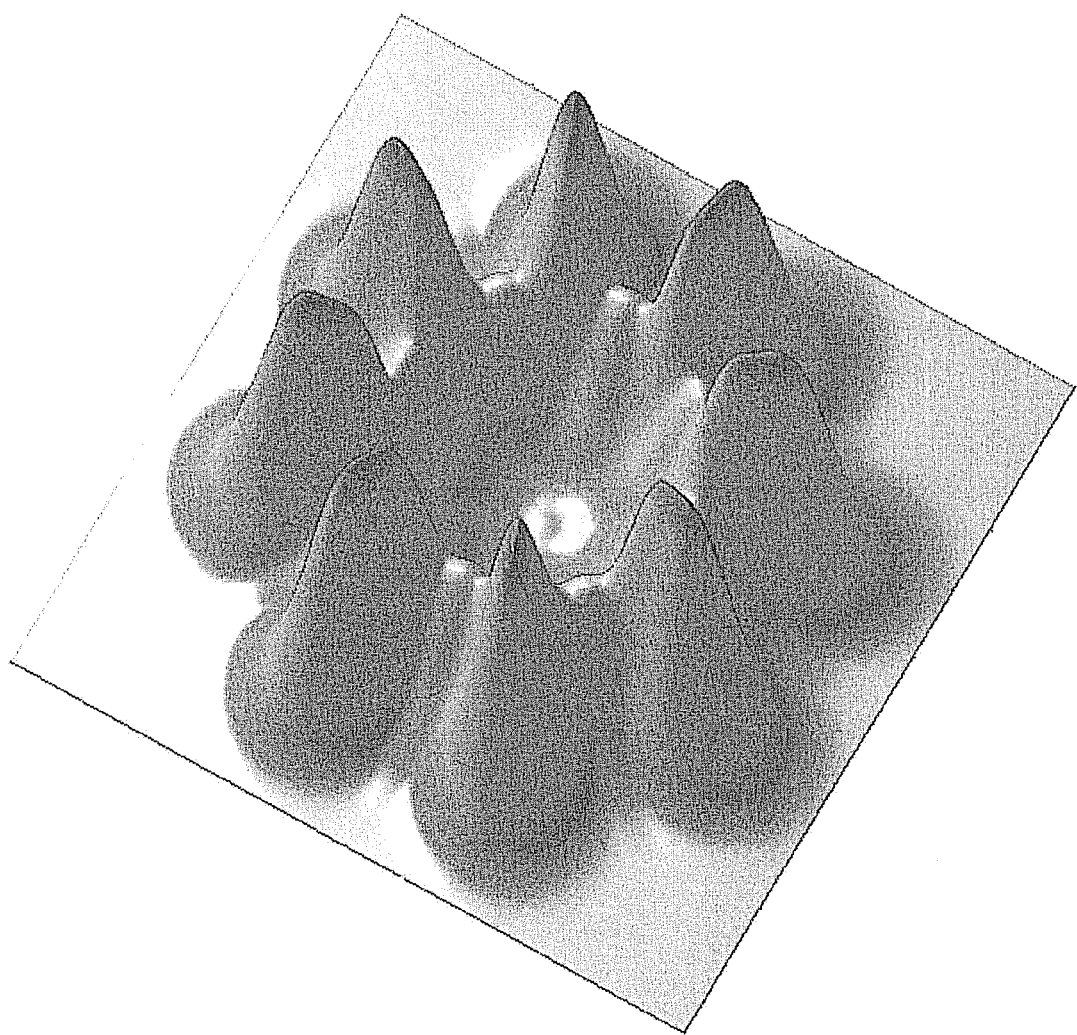
FIG. 10 is a three-dimensional plot showing an exemplary irradiance pattern of propagating laser beam after traveling 30 meters.

The irradiance of the laser beam that emerges from the apodizer is shown in FIG. 9. As the laser beam propagates, it changes shape because of the effects of diffraction. The shape of the laser beam at 30 meters is shown in FIG. 10.

It is also possible to generate the stripe pattern using other methods. One way to generate such a pattern is to use a diffractive element. Such elements are routinely used to produce a variety of patterns including lines, boxes, circles, and so forth. The pattern may be Gaussian along the short axis and nearly Gaussian along the longer axis. This minimizes divergence of the projected stripes and minimizes the presence of Fresnel diffraction ripples that can bias the calculated centroid or peak values.

Another way to produce a pattern is to use a collection of suitable lenses. For example, a stripe pattern having a Gaussian cross sectional profile can be created by using four cylindrical lenses whose beams are created and combined using a series of beam splitters and right angle prisms. The resulting pattern differs from the pattern shown in FIGS. 9 and 10 in that the beam does not decrease smoothly to a minimum at the center of the pattern. The quality of this pattern can, in principle, be made nearly as good as that obtained with apodizer 330.

Target

Within target 400, retroreflector 410 may be a cube-corner prism made of glass. Such a cube corner prism has three perpendicular faces that share a common point of intersection called the vertex. The top surface of the cube-corner prism is coated with an anti-reflection coating, and the three perpendicular glass faces are coated with a reflective coating, preferably a multi-layer thin film dielectric coating. It is possible to use a cube-corner prism made, not of solid glass, but of three mirrors at right angles to one another. This type of retroreflector is often called an open-air cube corner. The advantage of the glass prism over the open-air cube corner is that the glass bends the laser light inward in accordance with Snell's law. As a result, a cube-corner prism has a greater acceptance angle than an open-air cube corner. Another advantage of the glass cube corner is that no extra space is needed for the mirror thickness, which allows position detectors 432 to be closer to retroreflector 410.

The cube-corner prism may be made of high-index glass; for example, an index of refraction of 1.80 at a wavelength of 1550 nm. On possible example of such a glass is Ohara S-TIH53. High-index glass has the advantage of bending the light that passes from air into glass closer to the surface normal. Consequently, laser light 250 intersects the front surface of retroreflector 410 closer to the center. This reduces clipping of the laser beam by the edges of the cube corner.

It is also possible to use other types of retroreflectors such as a cateye retroreflector. The cateye retroreflector is made of glass components of either spherical or hemispherical shape. It is designed so that laser light entering its front (curved) surface passes through layers of glass in such a way as to bring the light to a small spot near the back surface. The back surface may be coated to be highly reflective in order to send the light back on itself. After retracing itself back through the glass, the light emerges from the cateye approximately collimated and parallel to the incoming beam of light.

Position detector assembly 430 comprises position detectors 432 and optical filter 434. Position detectors 432 may be linear photosensitive arrays. Such photosensitive arrays may be CCD or CMOS arrays, but CCD arrays are more readily available. In one embodiment, position detectors 432 are e2v model TH7815A. In one possible embodiment, these arrays contain 4096 pixels, each being 10 micrometers on a side. The length of the active detector area is 40.96 mm. The height and width of the chip package, including through leads, are 50 mm and 10.47 mm respectively.

It is possible to use other types of position detectors in place of linear photosensitive arrays. For example, one could form a linear array in the shape of a circle. It would also be possible to use an area array.

Optical filter 434 is made up of an optical bandpass filter and optional neutral density filter. The optical bandpass filter passes only a narrow band of wavelengths (say, 10-20 nm) centered about the wavelength of laser light 370. Other wavelengths are reflected or absorbed. The purpose of the bandpass filter is to prevent undesired background light from illuminating position detector 432 and thereby adding bias and noise to the measurements. A bandpass filter may be made by coating glass with a multi-layer stack of thin-film dielectric material. The reflectance properties of such filters change with the angle of incidence of the incoming light. The filter can be designed to pass the appropriate wavelengths over the full range of incident angles. For example, in one embodiment, the target is capable of operating over +/−45 degrees.

Optical filter 434 may also incorporate a neutral density filter. As mentioned above, in at least one embodiment the stripe pattern be bright enough to be seen by eye when striking a background object. The bright stripe pattern can help a user quickly find the laser beam if tracking unit 100 is not tracking target 400. Position detectors 30, on the other hand, need a relatively small amount of laser power; these devices saturate when the laser power is too high. There are two ways around these conflicting requirements. The first way is to increase the power of laser beam 370 when laser beam 250 is not tracking on retroreflector 410 and then decrease the power of laser beam 370 when tracking begins. The second way is to place neutral density filters over position detectors 432 in order to reduce irradiance of laser beam 370 to an appropriate level. This second method has the added advantage of reducing background radiation relative to the saturation power of position detectors 30. One possible way to combine bandpass and neutral density functionality in a single filter is to coat neutral density glass with dielectric film layers to get the desired bandpass characteristics.

Another possible way to reduce sensitivity of the system to background light is to chop the laser beam (by modulating the laser power on and off at the desired rate) and to detect the laser light at the same rate. This method can provide very high rejection of background light.

There are several possible ways of mounting optical filter 434. For example, it may be glued directly to the top of each position detector 432, or it may be separated from each photosensitive array by mechanical means. In the latter case, an air gap will exist between optical filters 434 and position detectors 432. It is also possible to directly coat position detectors 432 to provide optical filtering.

Retroreflector 410, position detector assembly 430, and stylus 460 are all rigidly attached to probe body 450. Retroreflector 410 and position detectors 432 may be held rigidly by a common structural component having a suitable coefficient of thermal expansion (CTE). Probe body 450 can also be attached to this common structural component. Having common structural mounting helps reduce mechanical movement from flexing or thermal expansion of printed circuit board material.

Locator spot 480, which is shown in FIG. 5, may be a photogrammetric target illuminated by at least one LED 354, or it can be a point source of light such as an LED. The purpose of locator spot 480 is to provide a correspondence between each of the stripes of laser beam 370 and the regions of intersection of the stripes on position sensors 432A, 432B. When tracking unit 100 is operating in tracking mode, laser beam 550 is kept centered on camera 352. Locator spot 480 is found on the camera at a position that corresponds to the target orientation; for example, it is located below the center of camera 352 if target 400 is in the upright position.

Several devices may be used as alternatives to locator spot 480 to identify the stripes that intersect position detectors 432A, 432B. One alternative device is a mechanical beam blocker that selectively prevents light from reaching the various stripes within the pattern projector assembly 300. Another alternative is a tilt sensor located within target 400 and tracking unit 100. The relative tilt of target 400 to tracking unit 100 identifies each stripe.

Light that intersects position detectors 432A, 432B is converted into an electrical signal by the detectors and must be processed electrically to find the peak or centroid of the intersecting stripes. It must be further processed to find the yaw, pitch, and roll angles of target 400 and coordinates of probe tip 470. This processing may be done by electronics on target 400 or they may be relayed by wired or wireless means back to tracking unit 100, power supply/control unit 10, or computer 20 for processing.

Measurement Concept

Figure 11A:
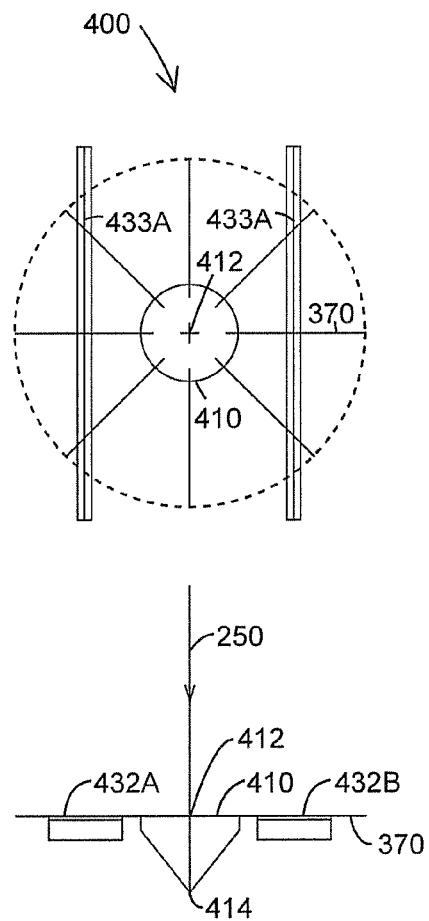
FIGS. 11A and 11B are top and side schematic views of components of an exemplary target for angles of incidence of 0 and 45 degrees, respectively.

FIG. 11A shows front and side views of laser beam 250 striking cube corner retroreflector 410 at normal incidence and laser beam 370 striking position sensors 432A, 432B at normal incidence. Laser beam 250 strikes vertex 414 and also center 412 of the top face of cube corner retroreflector 410. Laser beam 250 is kept centered at vertex 414 by the combined action of position detector 230 and motor assemblies 125, 155. Laser beam 370 is always coincident with laser beam 250. In the particular case shown in FIG. 11A, the stripes of laser beam 370 intersect active area 433A of position detector 432A in three regions and active area 433B of rightmost detector 432B in three regions. The number of points of intersection depends on the roll angle of target 400 relative to tracking unit 100, as is explained in more detail below.

Figure 11B:
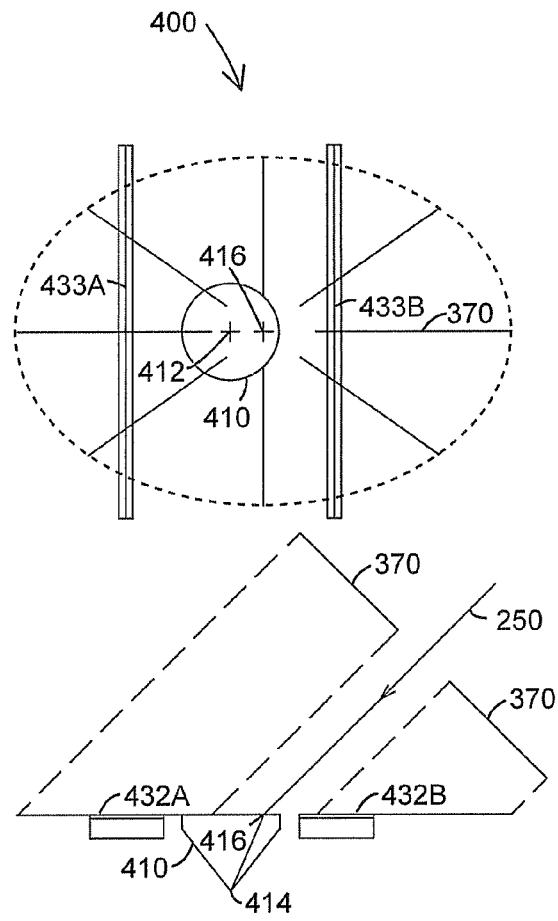

FIG. 11B shows front and side views of laser beam 250 striking cube corner retroreflector 410 at 45 degrees from normal incidence and laser beam 370 striking position sensors 432A, 432B at 45 degrees from normal incidence. Laser beam 250 bends inward toward the surface normal when it passes from air into the glass. In this case, the index of refraction of the glass is 1.8, and so by Snell's law the angle of the laser beam with respect to the surface normal is arcsin (sin(45°)/1.8)=23.1°. Because laser beam 370 strikes position detectors 432A, 432B at an angle of 45 degrees, the pattern of laser stripes when viewed from the top is an ellipse rather than a circle. If stripes within laser beam 370 are extended along straight lines, they intersect top surface of retroreflector 410 at point 416. As laser beams 250 and 370 are tilted further from the surface normal, point of intersection 416 moves further away from center 412 of the top surface of retroreflector 410.

It is the movement of the intersection point 416 away from center point 412 that makes it possible to find the pitch and yaw of target 400. This movement can occur if the center of symmetry of retroreflector 410 is located off the plane of position sensors 432A, 432B. In the case of the cube corner retroreflector, the vertex is always located below the top surface of the retroreflector, and so this condition is met for the configuration shown in FIGS. 11A and 11B.

FIGS. 12A and 12B show target 1400, an alternative embodiment that is the same as target 400 except that retroreflector 410 is raised somewhat above the plane of position detectors 432A, 432B. Laser beam 250 strikes the top surface of cube corner retroreflector at the same location 416 relative to center 412 as in target 400. However, as can be seen from FIG. 12B, the stripes of laser beam 370 intersect active areas 433A, 433B in different regions than in target 400. Also the effective point of intersection 416 has moved. The side view of FIG. 12B shows that the effective point of intersection 416 can be found by extending laser beam 250 along its original air path into the glass. The point at which the center of laser beam 250 intersects the plane of position detectors 432A, 432B is the effective point of intersection 416 when viewed from the top.

The effect of raising retroreflector 410 above the plane of position detectors 432A, 432B is to cause the point of intersection 416, as seen from the top view, to move closer to center 412. Another effect is to reduce the portion of the stripes that intersect position detectors 432A, 432B. Retroreflector 410 may be raised as high as desired as long as the stripes of laser beam 370 are not occluded from reaching position detectors 432A, 432B.

By raising retroreflector 410 above the plane of position detectors 432A, 432B, it is possible, using commercially available linear CCD arrays, to measure pitch and yaw angles over the range of 0 to 45 degrees. This capability is demonstrated in FIG. 13. The small inset at the top right of FIG. 13 shows the conventions used for pitch, roll, and yaw angles. The x axis is has the same direction as position detectors 432A, 432B. A yaw angle corresponds to a rotation about the x axis. Pitch and roll angles correspond to rotations about the y and z axes, respectively.

FIGS. 11B and 12B show the effect of yaw rotation for a pitch angle of zero. As target 400 is yawed to the left, the stripe separation increases on position detector 433A and decreases on position detector 433B. If target 400 were rotated in pitch angle, the stripes of laser beam 370 would move up or down on position detectors 432A, 432B. If target 400 were rotated in the roll angle, the stripes of laser beam 370 would rotate about intersection point 416. Camera assembly 350 and locator spot 480 are used to draw a correspondence between each stripe generated by stripe generator 300 and each region of stripe intersection on position detectors 432A, 432B.

FIGS. 13A-K show the general case. Here the overall tilt is 45 degrees. The direction of tilt is the direction from center 412 to point of intersection 416. The stripes are stretched into an elliptical pattern having a major (long) axis along the direction of tilt. A laser stripe does not necessarily lie on the long axis. The tilt is entirely a yaw angle if the direction of tilt is perpendicular to position detectors 432A, 432B. The tilt is entirely a pitch angle if the direction of tilt is parallel to position detectors 432A, 432B. The tilt is a combination of yaw and pitch for other cases. The roll angle is indicated by the orientation of each stripe with respect to some reference and is based partly on the information provided by locator spot 480.

FIG. 13A shows the case in which target 400 has a yaw angle of 45 degrees and a pitch angle of zero (relative to the incoming laser beam). Laser beam 370 approaches target 400 from the right in this instance and, because of this, the major axis of the ellipse that encompasses the stripes is along the y (horizontal) axis. Note that the stripes intersect position detector 432A in 3 regions and position detector 432B in 3 regions. FIG. 13K shows the case in which target 400 has a pitch angle of 45 degrees and a yaw angle of zero. Laser beam 370 approaches target 400 from the top so that the major axis of the ellipse is along the z (vertical) axis. Stripes still intersect position each position detector 432A, 432B in 3 regions, but now the stripes are shorter and so the regions of intersection occur nearer the ends of the stripes.

In moving from FIG. 13A to FIG. 13K, the direction of the tilt changes by 10 degrees per step. This series of figures shows that there are always at least two pairs of opposing stripes that point unambiguously to a single spot 416. This condition is sufficient to find the pitch and yaw angles of target 400.

Measurement Method

The measurement concept described so far explains the general method and apparatus that enables measurement of six degrees of freedom. some possible computational methods that can be used will be described.

Defined are three angles phi, theta, and roll that fully constrain the position of the target relative to the laser beam coming from the laser tracker. First the z axis is defined as the axis perpendicular to the plane that holds position detectors 432A, 432B, and the x axis is defined as along the direction of position detectors 432A, 432B. They axis is perpendicular to the x and z axes. The angles theta and phi are defined in the usual way with respect to the laser beam in a spherical coordinate system. Theta is the angle from the z axis to the laser beam, and phi is the angle from the x axis to the projection of the laser beam onto the xy plane. By convention, it is assumed that the laser beam has a phi of 0 degrees if it arrives from the top of a two dimensional figure such as FIGS. 11-13. A phi of +90, +180, and +270 degrees indicates arrival of the laser beam from the right, bottom, and left, respectively. The roll angle is taken with respect to a particular reference stripe emitted by the laser tracker. For example, suppose that probe 400 and tracking unit 100 are oriented as shown in FIG. 1 and also suppose that the laser stripes are emitted in the orientation shown in FIG. 8. If the apodizer stripe in the upper right side of FIG. 8 is selected as the reference stripe, then a roll angle for that stripe can be established in relation to the angle phi=0 degrees. In this case, since the reference stripe is rotated 22.5 degrees with respect to phi=0 degrees, one could say that the roll angle for the light projected from the apodizer is 22.5 degrees. If the probe were tilted by 45 degrees with respect to this initial position, the new roll angle would be 22.5+45 degrees=67.5 degrees. In this way, the roll angle can take on any value from 0 to 360 degrees.

Because the shape of the laser beam evolves as it propagates, as shown in FIGS. 9 and 10, it is necessary to account for the change in the intersection pattern of the stripes with position detectors 432A, 432B. Furthermore, the stripes are not perfectly uniform, and so the exact pattern of intersection of the laser beam with the stripes depends on the exact shape of the stripes. In practice, therefore, one may sample the patterns observed on position detectors 432A, 432B at different distances and different angles of tilt (phi, theta, and roll).

Figure 14:
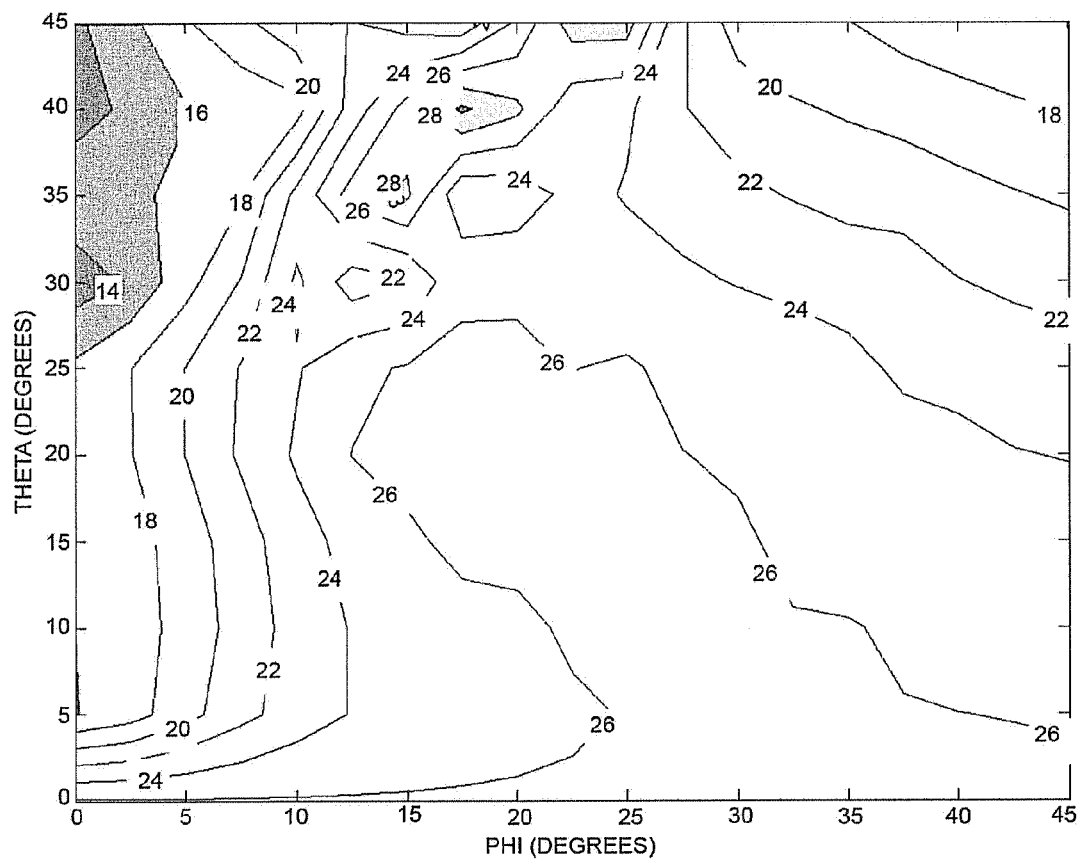
FIG. 14 is a graph showing errors characteristic of one possible embodiment.

To optimize accuracy of the measurement, probe tip 470 may be placed directly beneath retroreflector 410. A numerical analysis was carried out based on the signal-to-noise ratio of position detectors 432A, 432B and the variability of projected laser pattern 370. FIG. 14 shows the resulting errors in micrometers for angles of phi and theta from 0 to 45 degrees. The maximum error in this case is 28 micrometers. This small error is acceptable at this range.

Computational Method

Figure 15:
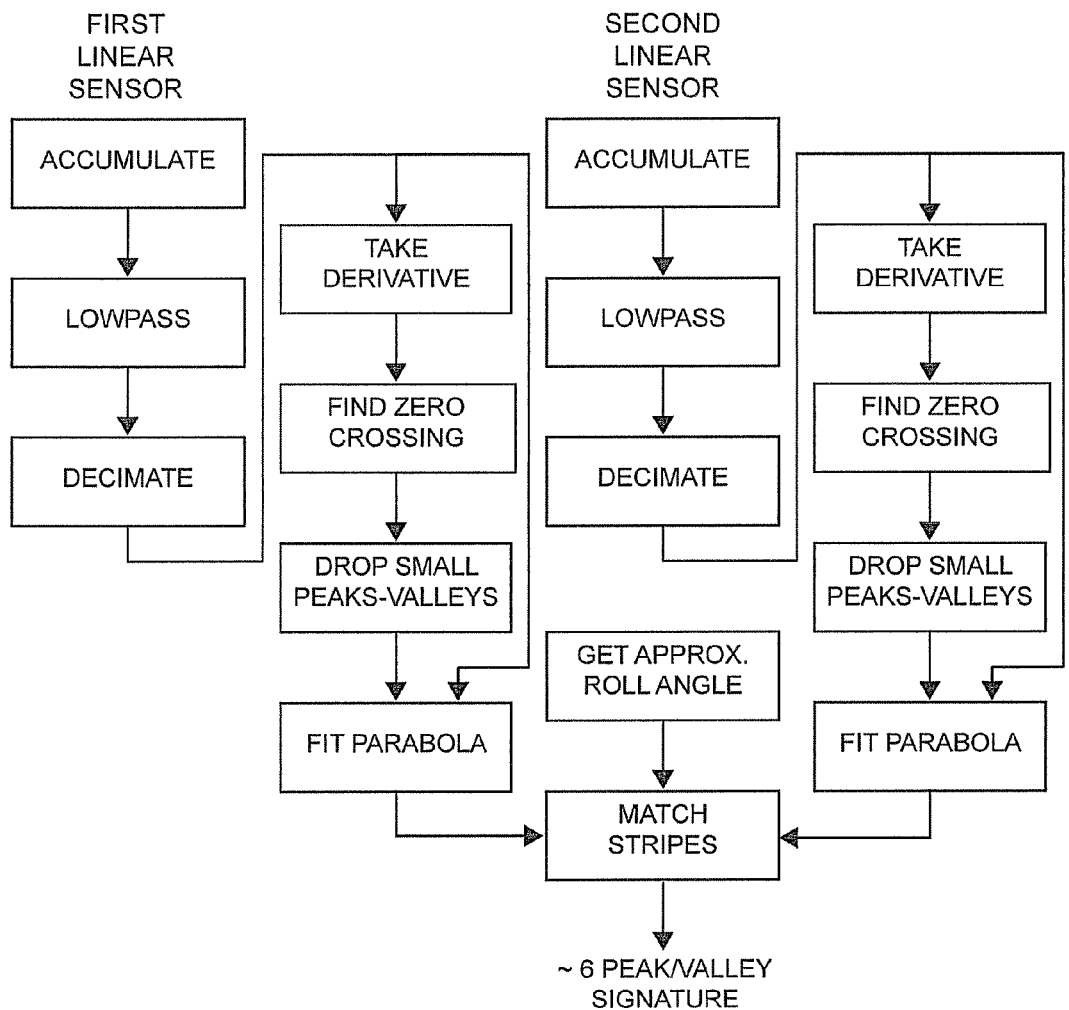
FIG. 15 shows an exemplary method of calculating the signature of a laser patter on position detectors.

FIG. 15 shows an exemplary method of calculating the signature of the laser pattern on position detectors 432A, 432B. The signature is defined as the position of up to six peaks and valleys on the two position detectors. Each of these peaks is associated with a particular stripe and each of the valleys falls between two peaks. The signature also provides a subpixel location for the intersection of the center of each peak or valley on the array.

The first several computational steps are the same on first position detector 432A and second position detector 432B. These steps are accumulate, lowpass, decimate, take derivative, find zero crossing, drop small peaks-valleys, and fit parabola. These computations may be carried out with a field-programmable gate array (FPGA), digital signal processor (DSP), microprocessor, or computer.

Each position sensor is illuminated by a laser beam, power and duty cycle of which may be adjustable, and for a particular integration time, which may also be adjustable. The adjustment in laser power or duty cycle takes place within the laser tracker. The adjustment in integration time takes place within the linear array by adjusting the "electronic shutter time". In either case, the objective is to provide enough light for enough time to obtain a good signal to noise ratio without saturating the detectors.

Each set of pixel samples are collected at high speed. The samples are accumulated, as shown in FIG. 15, by collecting the set of pixel values some number of times and averaging these together. As an example, 4096 pixel values from position detectors 432A, 432B may be collected at 1600 frames per second and averaged in groups of 8 frames to give an effective data collection rate for the 4096 pixels of 200 Hz.

The accumulated data is next filtered and decimated. Both processes can be carried out together by a digital filter. The simplest type of filtering averages some number of adjacent channels, but many filtering methods are available. The decimation removes some number of samples to simplify computation in later stages. As an example, the data may be decimated to one eighth the original number of data points.

To extract peaks and valleys from the data, four steps are taken. First the differences (derivatives) are taken between adjacent pixels. Second, the data is analyzed to find the zero crossings. These zero crossings represent the potential peaks and valleys. Third, peaks and valleys that are too small are dropped. These peaks and valleys may be very noisy or they may just be too small to be interesting. Fourth, a parabola is fit to the data near the peak or valley. This establishes the location of the peaks and valleys to subpixel resolution.

The position of locator spot 480 is used to get an approximate roll angle as a starting position for later calculations. The position of locator spot 480 is not known well enough on camera 352 to establish the exact roll angle.

The parabola peaks and valleys from the two position detectors are provided, along with the approximate roll angle from locator spot 480, and this information is used by the computing device to match each peak on position detectors 432A, 432B to a particular laser stripe.

Figure 16:
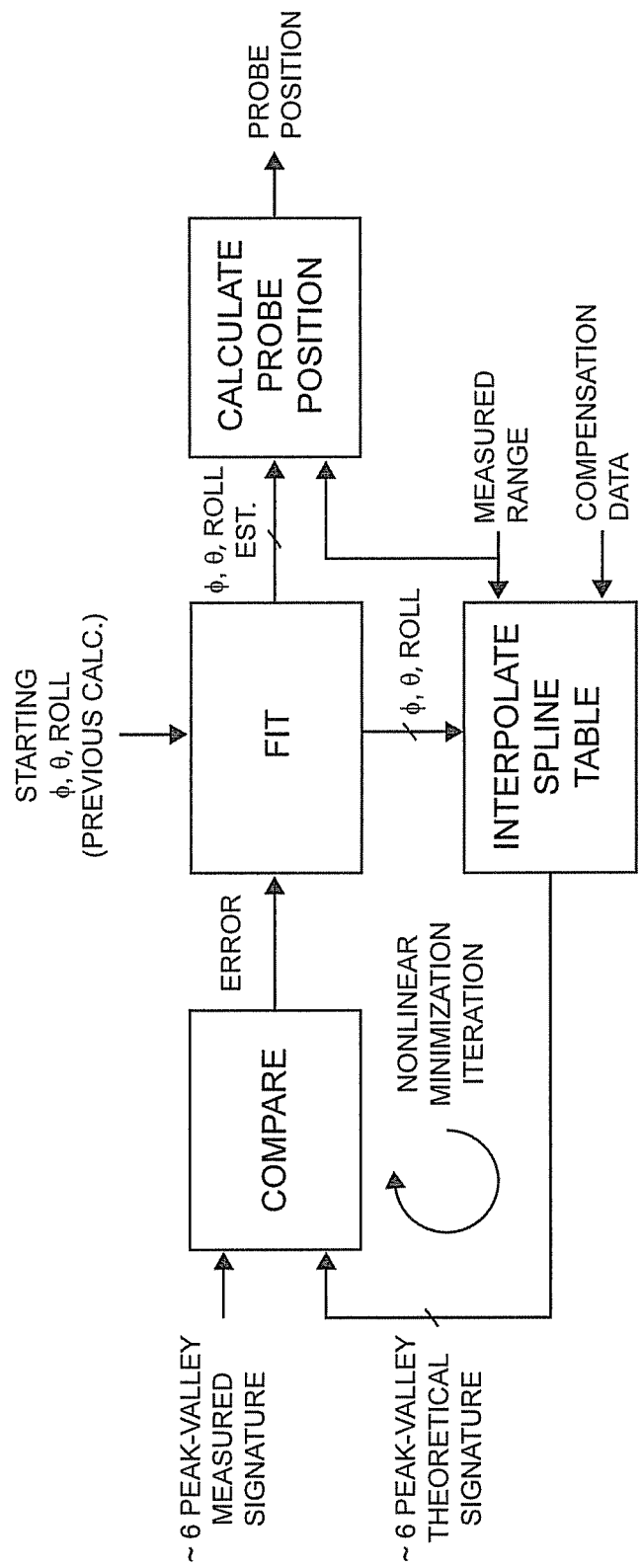
FIG. 16 shows an exemplary iterative process to calculate a position of a probe tip.

The resulting signature comprises the match of each stripe and the subpixel values for position detectors 432A, 432B. As shown in FIG. 16, the measured signature is provided to a COMPARE computing function. The COMPARE computing function compares the measured and theoretical signature values according to a method that is now explained.

The entire iterative computation shown in FIG. 16 is seeded with phi, theta, and roll values, which are provided from a previous calculation. This previous calculation may obtained from the last measured orientation of probe 400 or provided by an initial approximate calculation.

A FIT routine shown in FIG. 16 now performs iterative adjustments (typically two or three iterations) to find the values of theta, phi, and roll that result in the best match between the measured and theoretical signatures. The new phi, theta, and roll are sent to the spline table shown in FIG. 16, along with the known distance to the target as measured by the laser tracker. In addition, compensation data that provides geometrical relations of the detectors and retroreflector on target 400 are sent to the spline table. From this data, an interpolated value emerges that gives new more accurate guesses for the positions of the peaks and valleys. This more accurate guess is called the theoretical signature.

The procedure is continued until the difference in the measured and theoretical signatures is small enough that the convergence criteria of the fit routine are satisfied. At this point, the best guess values for phi, theta, and roll are used to calculate the position of the probe tip. This calculation takes into account the length and geometry of the stylus and probe in relation to the rest of target 400.

Target Camera

Camera assembly 350 comprises camera 352 and at least one light emitting diode (LED) 354. As explained above, camera assembly may be used in conjunction with locator spot 480 to identify each of the stripes that intersects position sensors 432. In addition, camera assembly 350 may be used to enhance operation of the general purpose laser tracker, whether measuring three or six degrees of freedom.

For the general purpose laser tracker applications, the LEDs are usually flashed repetitively. Light from the LEDs bounces off retroreflectors and returns to a nearby camera. The camera image shows the normal scene as well as each of the retroreflectors flashing in unison with the LEDs. Based on this flashing pattern, the operator can quickly learn the number and location of retroreflectors.

One advantage of the camera is that it can speed acquisition of targets. However, in trackers available today, the camera (if present) is located off the optical axis of the tracker. The resulting parallax makes it impossible for the tracker to immediately drive to the correct angle of the selected retroreflector.

Camera assembly 350 gets around this problem by mounting camera 352 on the tracker optical axis or optical axis of the pattern projector assembly, which eliminates the parallax. Another way to get around the problem is to use two cameras 352 equally or symmetrically spaced on either side of or around the tracker optical axis or optical axis of the pattern projector assembly, as seen in FIG. 17. In FIG. 17, the cameras 352 are positioned on either side of the output window 246. LEDs 354 are provided proximate to cameras 352 to complete the camera assembly. In this case, triangulation can be used to find the position of the target. In another embodiment, the cameras are not required to be positioned symmetrically about the optical axis. It is possible to calculate the three-dimensional position of a retroreflector as long as the position of the two cameras in the tracker frame of reference and the two angles measured by each of the two cameras are known.

Camera assembly 350 can drive to any desired retroreflector. The operator may do this by selecting the desired SMR on a computer screen. Alternatively, the computer may be set up to automatically acquire an SMR whenever it is brought into the field of view. This feature is most useful when only one SMR is present.

One common use of targeting cameras is to set up a survey measurement of a number of retroreflector targets. With current trackers, this is done by selecting one SMR after another on the computer screen and then searching with the tracker to find each target. The laser beam may be placed near to the target at the start of the measurement. With in-line camera assembly 350, it is possible to automatically and quickly locate each retroreflector in the environment and automatically create a survey pattern. This can save considerable time, particularly when targets are difficult to reach. A good example of such time savings is the joining of two fuselage sections of an airliner. One method of performing this join is to attach a number of small retroreflector targets onto the two fuselage sections, in many cases at locations that are not easy to reach. A completely automated survey greatly simplifies this procedure.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser tracker configured to locate a retroreflector target, the laser tracker comprising:
    a payload assembly configured to emit a first beam of light along a main optical axis extending from the laser tracker;
    a first motor and a second motor configured to together direct the first beam of light along the main optical axis in a first direction, the first direction determined by a first angle of rotation about a first axis and a second angle of rotation about a second axis, the second axis substantially perpendicular to the first axis, the first angle of rotation produced by the first motor and the second angle of rotation produced by the second motor, wherein the payload assembly is configured to rotate about the first axis and the second axis;
    a first angle measuring device configured to measure the first angle of rotation and a second angle measuring device configured to measure the second angle of rotation;
    a distance meter configured to measure a first distance from the laser tracker to the retroreflector target;
    a first camera assembly including a first camera and a first light source, the first camera assembly rigidly affixed to the payload assembly, the first camera having a first camera optical axis extending from the payload assembly, the first camera optical axis generally in the same direction as the main optical axis and offset with respect to the main optical axis, the first light source proximate to the first camera, the first light source configured to illuminate the retroreflector target to produce a first retroreflected light, the first camera configured receive the first retroreflected light and to produce a first image; and
    a second camera assembly including a second camera and a second light source, the second camera assembly rigidly affixed to the payload assembly, the second camera having a second camera optical axis extending from the payload, the second camera optical axis offset generally in the same direction as the main optical axis and offset with respect to the main optical axis and to the first camera optical axis, the second light source proximate to the second camera, the second light source configured to illuminate the retroreflector target to produce a second retroreflected light, the second camera configured receive the second retroreflected light and to produce a second image.

2. The laser tracker of claim 1 wherein the first camera optical axis and the second camera optical axis are placed symmetrically about the main optical axis.

3. A method for locating a retroreflector target with a laser tracker, the method comprising:
    providing a payload assembly configured to emit a first beam of light along a main optical axis extending from the laser tracker;
    providing a first motor configured to rotate the payload about a first axis by a first angle of rotation;
    providing a second motor configured to rotate the payload about a second axis by a second angle of rotation, wherein the second axis is substantially perpendicular to the first axis;
    providing a first camera assembly including a first camera and a first light source, the first camera assembly rigidly affixed to the payload, the first camera having a first camera optical axis extending from the payload, the first camera optical axis generally in the same direction as the main optical axis and offset with respect to the main optical axis, the first light source proximate to the first camera;
    providing a second camera assembly including a second camera and a second light source, the second camera assembly rigidly affixed to the payload, the second camera having a second camera optical axis extending from the payload, the second camera optical axis offset generally in the same direction as the main optical axis and offset with respect to the main optical axis, the second camera optical axis offset generally with respect to the first camera optical axis, the second light source proximate to the second camera;

emitting the first beam of light;

illuminating the retroreflector target with a third light from the first light source to produce first retroreflected light from the retroreflector target;

illuminating the retroreflector target with a fourth light from the second light source to produce second retroreflected light from the retroreflector target;

receiving the first retroreflected light by the first camera and producing a first camera image in response;

receiving the second retroreflected light by the second camera and producing a second camera image in response;

determining a first calculated angle of rotation and a second calculated angle of rotation to steer the main optical axis toward the retroreflector target, the first calculated angle of rotation and the second calculated angle of rotation based at least in part on the first camera image and the second camera image; and rotating the payload by the first calculated angle of rotation about the first axis and the second calculated angle of rotation about the second axis.

4. The method of claim 3 further comprising:

providing a position detector;

receiving the first beam of light at the retroreflector target and returning a third retroreflected beam of light in response;

receiving a portion of the third retroreflected beam of light at the position detector; and rotating the payload with the first motor and the second motor to place the third retroreflected beam of light in a preferred position on the position detector.

5. The method of claim 4 further comprising:

providing a first angle measuring device, a second angle measuring device, and a distance meter;

measuring a third angle with the first angle measuring device;

measuring a fourth angle with the second angle measuring device;

measuring a first distance from the laser tracker to the retroreflector target based at least in part on a time for the first beam of light to travel from the payload to the retroreflector target; and providing a three-dimensional coordinate of the retroreflector target based at least in part on the third angle, the fourth angle, and the first distance.

6. The method of claim 3 wherein:

in the step of illuminating the retroreflector target with a third light, the third light is flashed repetitively; and in the step of illuminating the retroreflector target with the fourth light, the fourth light is flashed repetitively.

7. The method of claim 3 wherein:

in the step of providing a first camera assembly, the first light source includes a first LED; and in the step of providing a second camera assembly, the second light source includes a second LED.

8. The method of claim 3 wherein, in the steps of providing the first camera assembly and the second camera assembly, the first camera optical axis and the second camera optical axis are placed substantially symmetrically about the main optical axis.

* * * * *